United States Patent
Wetherbee et al.

(10) Patent No.: US 12,367,423 B2
(45) Date of Patent: Jul. 22, 2025

(54) SYSTEM AND METHOD FOR ENSURING THAT THE RESULTS OF MACHINE LEARNING MODELS CAN BE AUDITED

(71) Applicant: ORACLE INTERNATIONAL CORPORATION, Redwood Shores, CA (US)

(72) Inventors: Edward R. Wetherbee, Omaha, NE (US); Kenneth P. Baclawski, Waltham, MA (US); Guang C. Wang, San Diego, CA (US); Kenny C. Gross, Escondido, CA (US); Anna Morav, East Palo Alto, CA (US); Dieter Gawlick, Palo Alto, CA (US); Zhen Hua Liu, San Mateo, CA (US); Richard Paul Sonderegger, Dorchester, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/615,599

(22) Filed: Mar. 25, 2024

(65) Prior Publication Data

US 2024/0265308 A1     Aug. 8, 2024

Related U.S. Application Data

(63) Continuation of application No. 16/826,478, filed on Mar. 23, 2020, now Pat. No. 11,948,051.

(51) Int. Cl.
*G06N 3/00*     (2023.01)
*G05B 23/02*    (2006.01)
(Continued)

(52) U.S. Cl.
CPC ........... *G06N 20/00* (2019.01); *G05B 23/024* (2013.01); *G06F 17/16* (2013.01); *G06F 17/18* (2013.01);
(Continued)

(58) Field of Classification Search
None
See application file for complete search history.

(56) References Cited

U.S. PATENT DOCUMENTS

| | | |
|---|---|---|
| 7,020,802 B2 | 3/2006 | Gross et al. |
| 7,613,576 B2 | 11/2009 | Gross et al. |
| 7,613,580 B2 | 11/2009 | Gross et al. |
| 7,702,485 B2 | 4/2010 | Gross et al. |
| 7,869,977 B2 | 1/2011 | Lewis et al. |

(Continued)

FOREIGN PATENT DOCUMENTS

| | | |
|---|---|---|
| CN | 107181543 | 9/2017 |
| CN | 107181543 A | 9/2017 |
| CN | 110941020 A | 3/2020 |

OTHER PUBLICATIONS

Japanese Patent Office: "Office Action" issued in JP Application No. 2022-557900 having a date of issuance of Oct. 1, 2024 (4 pgs).

(Continued)

*Primary Examiner* — Tuankhanh D Phan
(74) *Attorney, Agent, or Firm* — Kraguljac Law Group, LLC

(57) ABSTRACT

Systems, methods, and other embodiments associated with auditing the results of a machine learning model are described. In one embodiment, a method accesses original time series data and machine learning estimates of the original time series data. The method generates reconstituted time series data from the machine learning estimates by reversing operations of a machine learning model trained for generating the machine learning estimates from the original time series data. The method detects tampering (or corruption) in the original time series data based on a difference between the original time series data and reconstituted time series data. And, the method generates an electronic verification report that indicates whether the tampering (or corruption) is detected in the original time series data.

20 Claims, 11 Drawing Sheets

(51) Int. Cl.
   *G06F 17/16*      (2006.01)
   *G06F 17/18*      (2006.01)
   *G06F 30/27*      (2020.01)
   *G06N 20/00*      (2019.01)
   *G06F 111/10*     (2020.01)
   *G06N 3/08*       (2023.01)
   *G06N 20/10*      (2019.01)

(52) U.S. Cl.
   CPC .......... *G06F 30/27* (2020.01); *G06F 2111/10* (2020.01); *G06N 3/08* (2013.01); *G06N 20/10* (2019.01)

(56) References Cited

U.S. PATENT DOCUMENTS

| | | |
|---|---|---|
| 8,055,594 B2 | 11/2011 | Dhanekula et al. |
| 8,069,490 B2 | 11/2011 | Gross et al. |
| 8,200,991 B2 | 6/2012 | Vaidyanathan et al. |
| 8,275,738 B2 | 9/2012 | Gross et al. |
| 8,341,759 B2 | 12/2012 | Gross et al. |
| 8,457,913 B2 | 6/2013 | Zwinger et al. |
| 8,543,346 B2 | 9/2013 | Gross et al. |
| 9,933,338 B2 | 4/2018 | Noda et al. |
| 10,452,510 B2 | 10/2019 | Gross et al. |
| 10,496,084 B2 | 12/2019 | Li et al. |
| 11,055,396 B2 | 7/2021 | Gross et al. |
| 11,429,885 B1 | 8/2022 | McNair |
| 2008/0140362 A1 | 6/2008 | Gross et al. |
| 2008/0252309 A1 | 10/2008 | Gross et al. |
| 2008/0252441 A1 | 10/2008 | McElfresh et al. |
| 2008/0256398 A1 | 10/2008 | Gross et al. |
| 2009/0099830 A1 | 4/2009 | Gross et al. |
| 2009/0125467 A1 | 5/2009 | Dhanekula et al. |
| 2009/0306920 A1 | 12/2009 | Zwinger et al. |
| 2010/0023282 A1 | 1/2010 | Lewis et al. |
| 2010/0033386 A1 | 2/2010 | Lewis et al. |
| 2010/0305892 A1 | 12/2010 | Gross et al. |
| 2010/0306165 A1 | 12/2010 | Gross et al. |
| 2012/0030775 A1 | 2/2012 | Gross et al. |
| 2013/0157683 A1 | 6/2013 | Lymberopoulos et al. |
| 2014/0354300 A1 | 12/2014 | Ramachandran et al. |
| 2015/0137830 A1 | 5/2015 | Keller, III et al. |
| 2016/0097833 A1 | 4/2016 | Han et al. |
| 2016/0098561 A1 | 4/2016 | Keller et al. |
| 2017/0163669 A1 | 6/2017 | Brown et al. |
| 2017/0249376 A1 | 8/2017 | Garvey et al. |
| 2018/0011130 A1 | 1/2018 | Aguayo Gonzalez et al. |
| 2018/0060203 A1 | 3/2018 | Gupta et al. |
| 2018/0276044 A1 | 9/2018 | Fong et al. |
| 2018/0349797 A1 | 12/2018 | Garvey et al. |
| 2019/0102718 A1 | 5/2019 | Agrawal |
| 2019/0163719 A1 | 5/2019 | Gross et al. |
| 2019/0196892 A1 | 6/2019 | Matei et al. |
| 2019/0197045 A1 | 6/2019 | Kraljevic et al. |
| 2019/0197145 A1* | 6/2019 | Gross ................. G06F 16/2365 |
| 2019/0237997 A1 | 8/2019 | Tsujii et al. |
| 2019/0243799 A1 | 8/2019 | Gross et al. |
| 2019/0286725 A1* | 9/2019 | Gawlick ............ G06F 16/2264 |
| 2019/0378022 A1 | 12/2019 | Wang et al. |
| 2020/0144204 A1 | 5/2020 | Keller, III et al. |
| 2020/0201950 A1 | 6/2020 | Wang et al. |
| 2020/0387753 A1 | 12/2020 | Brill et al. |
| 2021/0081573 A1 | 3/2021 | Gross et al. |
| 2021/0158202 A1 | 5/2021 | Backlawski et al. |
| 2021/0174248 A1 | 6/2021 | Wetherbee et al. |
| 2021/0270884 A1 | 9/2021 | Wetherbee et al. |
| 2021/0295210 A1* | 9/2021 | Wetherbee .......... G05B 23/024 |

OTHER PUBLICATIONS

Wikipedia, Snapshot Isolation, pp. 1-6, downloaded Mar. 19, 2020 from: https://en.wikipedia.org/wiki/Snapshot_isolation.
Boris Glavic, Illinois Institute of Technology, A Primer on Database Provenance, Sep. 2014, pp. 1-10.
Patent Cooperation Treaty (PCT) International Search Report and Written Opinion of the International Searching Authority in PCT International Application No. PCT/US2021/015359, International filing date Jan. 28, 2021 (Jan. 28, 2021), having a date of mailing of Apr. 9, 2021 (Apr. 9, 2021), 34 pgs.
Patent Cooperation Treaty (PCT) International Search Report and Written Opinion of the International Searching Authority in PCT International Application No. PCT/US2021/014106, International filing date Jan. 20, 2021 (Jan. 20, 2021), having a date of mailing of Apr. 26, 2021 (Apr. 26, 2021), 11 pgs.
Huang H, et al. "Electronic counterfeit detection based on the measurement of electromagnetic fingerprint," Microelectronics Reliability: an Internat . Journal & World Abstracting Service, vol. 55, No. 9, Jul. 9, 2015 (Jul. 9, 2015) pp. 2050-2054.
Bouali Fatma et al. "Visual mining of time series using a tubular visualization," Visual Computer, Springer, Berlin, DE, vol. 32, No. 1, Dec. 5, 2014 (Dec. 5, 2014), pp. 15-30.
Patent Cooperation Treaty (PCT) International Search Report and Written Opinion of the International Searching Authority in PCT International Application No. PCT/US2021/013633, International filing date Jan. 15, 2021 (Jan. 15, 2021), having a date of mailing of May 6, 2021 (May 6, 2021), 10 pgs.
Patent Cooperation Treaty (PCT) International Search Report and Written Opinion of the International Searching Authority in PCT International Application No. PCT/US2020/060083, International filing date Nov. 12, 2020 (Dec. 11, 2020), having a date of mailing of Mar. 19, 2021 (Mar. 19, 2021), 13 pgs.
Garcia-Martin Eva et al., "Estimation of Energy Consumption in Machine Learning," Journal of Parallel and Distributed Computing, Elsevier, Amsterdam, NL, vol. 134, Aug. 21, 2019 (Aug. 21, 2019), pp. 77-88.
Patent Cooperation Treaty (PCT) International Search Report and Written Opinion of the International Searching Authority in PCT International Application No. PCT/US2021/015802, International filing date Jan. 29, 2021 (Jan. 29, 2021), having a date of mailing of May 28, 2021 (May 28, 2021), 13 pgs.
1st NF OA dated May 21, 2021 from U.S. Appl. No. 16/820,807, filed Mar. 17, 2020, having a date of mailing of May 21, 2021, 36 pgs.
Deepika et al., Design & development of location identification using RFID with Wi-Fi positioning systems, 2017 Ninth Intl. Conference on Ubiquitous and Future Networks (ICUFN). IEEE, 2017) 6 pgs.
Whisnant et al.; "Proactive Fault Monitoring in Enterprise Servers", 2005 IEEE International Multiconference in Computer Science & Computer Engineering, Las Vegas, NV, Jun. 27-30, 2005.
U.S. Nuclear Regulatory Commission: "Technical Review of On-Lin Monitoring Techniques for Performance Assessment vol. 1: State-of-the-Art", XP055744715, Jan. 31, 2006, pp. 1-132.
Dickey et al.; Checking for Autocorrelation in Regression Residuals; pp. 959-965; Proceedings of 11th Annual SAS Users Group International Conference; 1986.
Hoyer et al.; Spectral Decomposition and Reconstruction of Nuclear Plant Signals; pp. 1153-1158; published Jan. 1, 2005; downloaded on Jul. 14, 2021 from: https://support.sas.com/resources/papers/proceedings-archive/SUGI93/Sugi-93-193%20Hoyer%20Gross.pdf.
Kenny Gross, Oracle Labs; MSET2 Overview: "Anomaly Detection and Prediction" Oracle Cloud Autonomous Prognostics; p. 1-58; Aug. 8, 2019.
Gribok, et al.,. "Use of Kernel Based Techniques for Sensor Validation in Nuclear Power Plants," International Topical Meeting on Nuclear Plant Instrumentation, Controls, and Human-Machine Interface Technologies (NPIC & HMIT 2000), Washington, DC, Nov. 2000, pp. 1-15.
Gross, K. C et al., "Application of a Model-Based Fault Detection System to Nuclear Plant Signals," downloaded from https://www.researchgate.net/publication/236463759; Conference Paper: May 1, 1997, 5 pages.
Singer, et al., "Model-Based Nuclear Power Plant Monitoring and Fault Detection: Theoretical Foundations," Intelligent System Application to Power Systems (ISAP '97), Jul. 6-10, 1997, Seoul, Korea pp. 60-65.

(56) References Cited

OTHER PUBLICATIONS

Wald, A, "Sequential Probability Ratio Test for Reliability Demonstration", John Wiley & Sons, 1947.
Patent Cooperation Treaty (PCT), International Search Report and Written Opinion issued in PCT International Application No. PCT/US2021/062380 having a date of mailing of May 24, 2022 (10 pgs).
Patent Cooperation Treaty (PCT), International Search Report and Written Opinion issued in PCT International Application No. PCT/US2021/062592 having a date of mailing of Jun. 14, 2022 (13 pgs).
1st NF OA from U.S. Appl. No. 16/804,531, filed Dec. 28, 2020, having a date of mailing of Jul. 20, 2021, 51 pgs.
Wang, Ray C., et al., Process Fault Detection Using Time-Explicit Kiviat Diagrams. AIChE Journal 61.12 (2015): 4277-4293.
Abran et al.; Estimation Models Based on Functional Profiles. Intl. Workshop on Software Measurement-IWSM/MetriKon, Kronisburg (Germany), Shaker Verlag. 2004 (Year: 2004).
Gou, Yuhua, "Implementation of 3d Kiviat Diagrams." (2008). (Year: 2008).

\* cited by examiner

SYSTEM AND METHOD FOR ENSURING THAT THE RESULTS OF MACHINE LEARNING MODELS CAN BE AUDITED

CROSS REFERENCE TO RELATED APPLICATIONS

This disclosure claims the benefit of U.S. Utility Patent Application Ser. No. 16/826,478 filed Mar. 23, 2020, titled "System and Method for Ensuring That the Results of Machine Learning Models Can Be Audited," inventors: Wetherbee et al., and assigned to the present assignee, which is incorporated by reference herein in its entirety.

BACKGROUND

With the reduction of the cost of sensor and processor technology, sensors are added to or associated with components of electrical, mechanical, distribution, and other systems to enable sensor-based automation. These sensors generate a flood of information describing the behavior of the components which is stored, at least for a time, in databases. Machine learning algorithms may be applied to the sensed information to enable prognostics, anomaly discovery/detection, and predictive maintenance for system components monitored by sensors.

Examples of sensor-based automation can be found in the electrical utility, oil-and-gas, environmental and water quality monitoring, data processing, manufacturing, passenger and cargo transportation, and even financial service sectors. In these sectors, behavior of equipment or systems and/or decisions made by machine learning processes may be subject to review by regulators. Such review may be based on the stored sensor information, and hefty fines for the offending entity may result from stored sensor information that shows non-compliant behavior. It is therefore worthwhile for the regulated entity and the regulator to be able to ensure that stored sensor information is not corrupted or tampered with.

For this and other reasons, what is needed is a technique for effectively and efficiently ensuring that the results of machine learning models can be audited.

SUMMARY

In one embodiment, a method for auditing the results of a machine learning model is provided. The method accesses original time series data and machine learning estimates of the original time series data. The method generates reconstituted time series data from the machine learning estimates by reversing operations of a machine learning model trained for generating the machine learning estimates from the original time series data. The method detects tampering (or corruption) in the original time series data based on a difference between the original time series data and reconstituted time series data. And, the method generates an electronic verification report that indicates whether the tampering (or corruption) is detected in the original time series data.

In one embodiment, reversing operations of the machine learning model in the method includes further steps. The method identifies the operations of the machine learning model. The method determines an inverse operation for each of the operations that undoes the operation. The method configures the inverse operations to be performed in a reverse order from that of the machine learning model. And, the method executes the inverse operations in the reverse order on the machine learning estimates to produce the reconstituted time series data.

In one embodiment, detecting tampering (or corruption) in the original time series data in the method further includes comparing values from the reconstituted time series data and original time series data pairwise using a sequential probability ratio test that detects the tampering as an anomaly.

In one embodiment, the method includes further steps prior to generating reconstituted time series data. The method selects a training data set from the original time series data that was captured prior to an update to the original time series data. And, the method trains the machine learning model to generate estimates consistent with correlation patterns learned between time series signals of the tamper-proof data set.

In one embodiment, prior to generating reconstituted time series data, the method reduces the complexity of the trained machine learning model by limiting the trained machine learning model to major components of a matrix that represents the trained machine learning model.

In one embodiment, the machine learning estimates are multivariate state estimates, and the machine learning model is a multivariate state estimation model.

In one embodiment, the method further displays the electronic verification report on a graphical user interface.

In one embodiment, one or more non-transitory computer-readable media that store computer-executable instructions that, when executed by at least a processor of a computer, cause the computer to execute the method for auditing the results of the machine learning model. In one embodiment, a computing system for auditing the results of the machine learning model is provided. The computing system includes a processor(s), a memory operably connected to the processor, and one or more non-transitory computer-readable media operably connected to the processor(s) and memory and storing computer-executable instructions that, when executed by at least the processor(s) of the computing system, cause the computing system to execute the method for auditing the results of the machine learning model.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
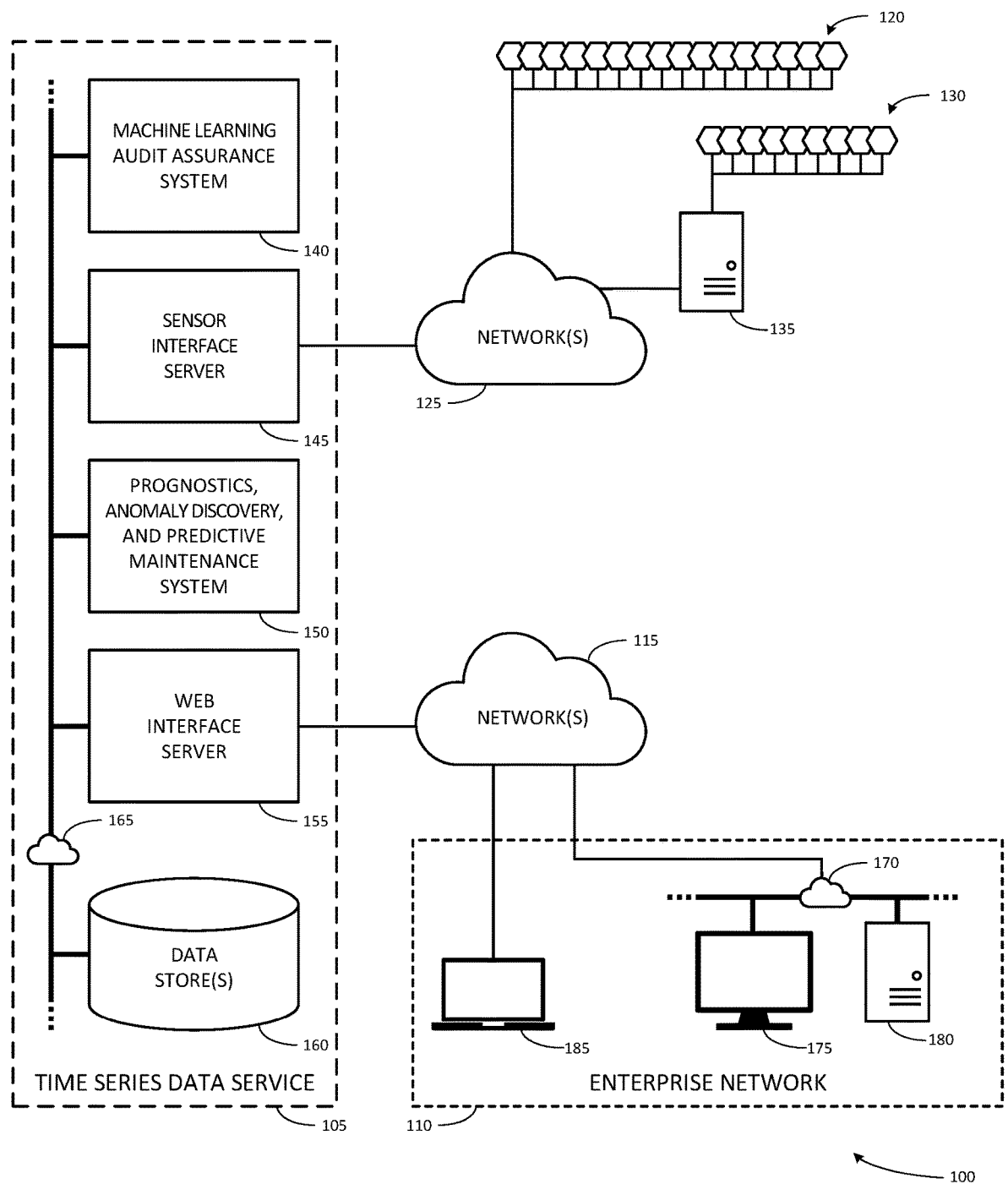
FIG. 1 illustrates one embodiment of a system associated with ensuring that the results of machine learning models can be audited.

Systems and methods are described herein that ensure that the results of machine learning models can be audited.

Sensors such as Internet-of-Things (IoT) sensors may be added to physical devices to monitor the operation of those devices. These sensors can be numerous, especially in dense-sensor industries such as utilities, oil & gas, and manufacturing. For example, an oil refinery can include over one million sensors. A utility grid can include well in excess of that number, especially when sensors for supervisory control and data acquisition (SCADA) on utility assets such as generating stations and transformer substations and sensors for advanced metering infrastructure (AMI) are taken into consideration. The data from these sensors may be stored as time-series—a series of data points indexed in time order, or pairs of values and associated time. The time-series data may be stored in time-series databases—database systems optimized for storing and serving time series. Accordingly, the utility industry can generate very large time-series databases of sensor readings, on the order of petabytes or greater.

Note that systems that ingest large volumes of time series signals that originate from systems with physical transducers will collect erroneous time-series values from failing physical transducers/sensors. It may be the case that some proportion of the sensors are degrading and/or could be failed with "stuck-at" faults, permanently signaling one value, regardless of input. It may also be the case that there may be intermittent problems with sensors or with upstream data-acquisition and/or data-aggregation electronics, individual time series may contain missing values. When these types of anomalies are undiscovered when the time-series data is captured into a time-series database, the anomalies affect subsequent uses of the data stored in the time-series database. For example, where the time-series data is used for product development or other scientific purposes, the accuracy of data analyses, and in some cases the soundness of conclusions drawn, will be negatively impacted by the above types of anomalies. The systems and methods described herein also enable a solution to this problem by providing for signal validation and sensor operability validation for time-series databases that originate from sensors monitoring critical assets.

Machine learning (ML) algorithms may be applied to sensor data stored in time-series databases to enable prognostics, anomaly discovery/detection, and predictive maintenance for devices monitored by sensors. This may be referred to as automated prognostic surveillance. One aspect of growing importance in dense-sensor industries, especially for utilities, is the ability to explain to regulators, insurance investigators, and end customers why a prognostic ML algorithm flagged one or more signals as anomalous, and of equal importance, why the ML did not raise alerts. Accordingly, the systems and methods described herein provide "auditability assurance" for pattern recognition ML determinations.

Industries such as utilities that make use of automated prognostic surveillance systems must satisfy legal requirements and are heavily subject to government regulations. For example, utilities in the United States are subject to local, county, state, and federal regulations including additional federal regulation from the United States Nuclear Regulatory Commission (USNRC) if the utility operates nuclear plants, as well as additional regulations from the North America Electric Reliability Corporation (NERC) and the Federal Energy Regulatory Commission (FERC). In principle, such requirements and regulations may involve submitting data for legal or regulatory purposes. However, submitting the entire mass of petabytes of data that underlies the decisions made by these large automated systems is infeasible, not only because of the enormous size of the data sets but also because very little of the data is persistently stored in a manner that would make such submissions possible.

Techniques for extracting data for legal and regulatory purposes are often subject to some or all of the following disadvantages: (i) the technique may select data using ad hoc, as-needed, or arbitrary criteria without a rigorous, theoretical basis; (ii) the selected data sets for the technique are inadequate for recovering the original source data; and (iii) the technique may make it possible to hide violations of regulatory requirements because of the inability to recover the original source data. Indeed, regarding the third disadvantage, it is reported that this has actually occurred in practice.

In particular, the lack of recoverability of original source data leads to an unnecessary adversarial relationship between industry and government. For example, electrical utilities operating in California are required to maintain a minimum 10% generation overhead cushion throughout each month, that is, whatever the demand is during any given day and time, there is at least 10% overhead or "spare" capacity, so that if one generating asset or grid transmission asset should suddenly fail, a total blackout is unlikely due to the overhead capacity. The utilities are required to submit monthly collections of time series data to the California Public Utilities Commission (PUC), to demonstrate that the utility maintained the minimum 10% generation overhead cushion throughout each month. Every time that generation capacity of the utility drops below the 10% generation-overhead cushion, the PUC imposes a significant fine (which can happen multiple times per month). The PUC scrutinizes the time-series signals very carefully because the PUC automatically assumes that the utility has an incentive to adjust some time series values to make it appear that generation capacity never drops below the 10% threshold. Similarly, the utility automatically assumes that the PUC has an incentive to adjust some time series values to make it appear that generation capacity dropped a fraction of a percent below the 10% threshold, thereby extracting significant fines from the utility.

These disadvantages (including the distrust on both sides) are eliminated by the systems and methods described herein that ensure that the results of machine learning models can be audited. In one embodiment for ensuring auditability, the following information should be retained, for example in a journal of changes to the database:

Sensed time-series data (for example, including time-stamped sensor readings and user associated with the sensor input, if any);

Descriptions of the sensors (for example, a sensed asset associated with the sensor, an operational state of the sensor at the time of the measurement);

Descriptions of the sensed assets (for example, a version of the asset at the time of the measurement, a record of a relationship between the asset and other assets—such as a temporal instance graph or temporal bill of materials);

A 'knowledge' state at the time of the measurement (for example, one or more particular machine learning models, particular conditions, and particular data used at the time of the analysis); and Identification of a version of machine learning model creation software and a data set used to develop particular machine learning models and analyze sensor readings.

Note that the sensed time-series data may be very bulky. In one embodiment, instead of a bulky data extract, a relatively small, but salient (or most prominent or important, collection of data can be saved from which one can recover a close approximation to the original data, which is sufficient for legal and regulatory requirements. A collection of saved data with this property of recoverability—that is, recoverability of the approximation of the original data from the saved data—is referred to herein as a "tamper-proof" data set. In one embodiment, the creation of a tamper-proof data set may involve one or more of the techniques described in "Intelligent Preprocessing of Multi-Dimensional Time-Series Data", inventors D. Gawlick, K. C. Gross, Z. H. Liu, and A. Ghoneimy, U.S. patent application Ser. No. 15/925,427, filed Mar. 19, 2018, which is hereby incorporated by reference herein in its entirety. While a malicious actor is not necessarily prevented from altering the original data, or even from altering the tamper-proof data set, but the systems and methods disclosed herein positively ensure that such tampering will be discovered in an audit conducted according to the procedures described herein.

In one embodiment, the systems and methods described herein thus enable creation of a close approximation to the original source data with a relatively small amount of processed data-a tamper-proof data set-which can be used to satisfy legal and regulatory requirements. Further, the tamper-proof data set can be used to satisfy these requirements while still accommodating machine-learning signal validation and sensor operability validation techniques.

In one embodiment, the processing technique for extracting the tamper-proof data set exhibits three advantageous properties:

Determinism: The processed data of the tamper-proof data set is uniquely determined by the input data without any randomness.

Compression: The processed data of the tamper-proof data set is relatively small compared with the input data. In practice, the processed data of the tamper-proof data set may be several orders of magnitude smaller.

Reversibility: It is possible to recover a relatively close approximation to the original source data from the processed data of the tamper-proof data set. In practice, the degree of approximation is determined by the legal and regulatory requirements, and may be adjusted to satisfy these requirements.

Processing techniques such as the Multivariate State Estimation Technique (MSET) exhibit the properties of determinism, compression, and reversibility and accordingly is used in one embodiment of this invention. But, any processing technique for extracting a data set that satisfies the three properties above can be used for the creation of a tamper-proof data set in accordance with the systems and methods described herein.

In one embodiment, in addition to the three properties above, automated techniques for determining whether the legal and regulatory requirements have been met based on the tamper-proof data set and historical provenance information (which tracks changes to the database, but does not assure data integrity). If the requirements have not been met, the system may determine the appropriate legal remedies or government fines. By making the legal and regulatory processes fully transparent to all parties, the motivation for attempting to hide violations and the adversarial relationship can be reduced significantly or even eliminated.

In one embodiment, the systems and methods described herein improve existing ML surveillance systems to which they are applied, causing increased accuracy of alerts and reducing false alarm rates for ML prognostic anomaly discovery. Note that these improvements may be realized by the implementation of the systems and methods described herein, and do not require hardware upgrades anywhere in the systems in which they are implemented. The systems and methods described herein are therefore immediately backward compatible with any existing IoT system. This is particularly advantageous in the power utility, oil & gas, manufacturing, and aviation industries where legacy sensor data collection systems are already in place and would require significant labor to upgrade.

The systems and methods described herein are described with reference to the power utility sector, but clearly have application wherever IoT sensor time series data is collected and used, for example in the oil & gas, manufacturing, and aviation sectors. In one embodiment, the systems and methods described herein may be applied in processing of streaming digitized data for utility assets inside generating facilities (for example, coal power plants, oil power plants, nuclear power plants, wind turbines, geothermal generators, gas turbine power plants, and others, as well as critical assets in the power distribution grid, such as transformers, substations, and SCADA systems).

—Auditability in Time-Series Processes for Utility Prognostics—

In one embodiment, a method and process for ensuring that the results of machine learning models can be audited includes features of (i) tamper-proofing, (ii) snapshot isolation, (iii) journaling, (iv) activity journaling, and (v) data provenance recording.

In one embodiment, tamper-proofing is a process or system configuration to ensure that malicious data modification (tampering) or accidental data modification (corruption) will be detected. In one embodiment, compact records that will expose any changes to the original data can be included in an audit report.

Anomalous values in time series data may be identified by ML processing of the raw time series data to produce estimates of what the values 'ought to be' in the context of surrounding data. Neural networks (NNs) and support vector machines (SVMs) may be employed for anomaly detection. MSET (and variants such as Oracle's proprietary advanced MSET pattern recognition "MSET2") may also be employed for anomaly detection. All three approaches (NNs, SVMs, and MSET) are, on a black-box level, Nonlinear nonparametric (NLNP) regression algorithms. NLNP regression is employed for prognostics, anomaly discovery/detection, and predictive maintenance in a time-series dataflow process primarily because a NLNP machine learning technique makes no assumptions about the linear or nonlinear relationships between/among the time series "signals," but instead learns those relationships empirically.

Of these 3 NLNP machine learning approaches, NNs and SVMs both employ stochastic (or apparently random) processes for optimization of the weights. For NNs, the stochastic optimization of weights occurs between perceptron layers. For SVMs, the stochastic optimization occurs in convex quadratic programming optimization of the regularization parameter to keep a balance between bias and variance in the SVM estimates. For example, in both cases (NNs and SVMs), if the pattern recognition is trained with data from Monday, versus if it is trained with data from Tuesday, the relationship between the output estimates and the input raw signals will be extremely similar. However, if one "looks into" the black box at the intermediate weights for the Monday computation compared with the intermediate weights for the Tuesday computation, the intermediate weights will be vastly different. For empirical pragmatic applications of pattern recognition only, as long as the outputs of the black box are accurate estimates of the underlying time series, it does not matter that that the weights inside the black box can be substantially different every time the black box is run. But, for the application of auditability, the randomness introduced by NNs and SVMs renders them unsuitable for extracting a tamper-proof data set because they are not deterministic, and therefore not reversible.

Applying MSET for anomaly detection (and associated prognostics and predictive maintenance) yields estimates that may be stored alongside the original raw time series telemetry values. In contrast to NNs and SVMs, MSET is a deterministic (but complex) mathematical algorithm, the MSET estimates are reversible as described above, which is useful for tamper-proofing in auditability assurance. In one embodiment therefore, MSET is applied for anomaly detection in a time-series data process to enable tamper proofing as part of auditability assurance. If any of the original raw data streams generated by this anomaly detection process were ever to be modified, altered, substituted or otherwise changed, either by a user with malicious intentions or accidentally through any data-corruption error in the storage media, the change to the original raw data values can be detected based on the accompanying MSET estimates. Or where the original raw data streams are not tampered with or are uncorrupted, the original raw data values can be validated or confirmed to be unchanged based on the accompanying estimates. This tamper-free certification may be performed at any time following the creation of the MSET estimates. This tamper-free certification is based on incorporation of the deterministic, reversible MSET algorithm into an anomaly detection process as described herein.

Accordingly, a compact data set for estimating the original values of a time-series data may be captured at any point in time and stored along side other information about changes made over the life of the time-series database, and employed in an auditability process.

In one embodiment, snapshot isolation forms a part of the auditability process. A temporal database offers the ability to store and retrieve any version of a record. The versions are identified by a strictly ascending transaction time—the time a version was available or visible for queries and follow-on processing. Each specific version may be referred to as a snapshot. In one embodiment, a tamper-proof data set created at a specific time may be used to validate the data values of the snapshots available at that creation time.

In one embodiment, that specific creation time for the tamper-proof data set may be the creation of a journal entry. Journaling processes are configured to track all changes to the database. Each change in the database results in creation of a journal entry in a journal associated with the database. Journals are typically highly resistant to data loss. For example, in a journaled database, no data changes on permanent media for the database, and no external notifications regarding the database are permitted until the journal data describing the change are stored. This enables auditing of the database even in the presence of failures. Journals allow the system to reconstruct any snapshot of a database even without temporal support, at the cost of a tremendous performance burden in snapshot queries. Every database has a copy of the most current snapshot, and temporal databases provide many snapshots back in time. For immutable data such as sensor readings, snapshots and journals can be stored as a single copy.

But, in one embodiment, auditing may use additional knowledge about the activities of users, for example, answering questions about "who saw what information and when (in response to a query)?" Or, "who inserted, updated, or deleted what information and when?" And, "what actions were done in the same transactions (how are the actions related)?" Such information may be recorded in an activity journal entry. The entries of the activity journal are synchronized with the standard journal entries. The activity journals thus provide additional context information describing the circumstances that lead to a database change and the attendant creation of a journal entry.

In one embodiment, information describing the data provenance may also be included in or synchronized with the standard journal entries, providing still further context information describing the circumstances that lead to a database change and the attendant creation of a journal entry. Data provenance information associates derived data with corresponding inputs, processing steps, and physical-processing environment. For example, provenance information identifies the data that form the basis of a query result. In one embodiment, provenance processes may be configured to re-write queries in order to determine these data. In the context of an audit, provenance metadata substantially reduces the data that have to be considered, as it retains a record of all data that formed the basis of a query result. In one embodiment, the provenance information may include further information such as descriptions of sensors that provide the data, operability states of the sensor, assets associated with the sensors, version of the asset, relationships between assets.

In one embodiment, the tamper-proof data sets are created in response to the change to the database, contemporaneously with the creation of the journal entry. In one embodiment, the tamper-proof data set is captured in the journal just like other metadata (change metadata including activity journaling as well as data provenance metadata) associated with the change. In one embodiment, the tamper-proof data set is captured for every change to the database, assuring that any subsequent alteration of data will be detected in an audit process conducted in accordance with the systems and methods described herein, (and incidentally also assuring that the machine learning software configuration in operation at the time of the change are captured and auditable along with the rest of the journal information). The systems and methods disclosed herein therefore enable an audit to be performed on original data in any snapshot of the data, regardless of later temporal evolution of the data in the time-series database. Auditability of the results of machine learning in a time-series database is thus ensured by enabling capture of all necessary information at each change to the database-journal entries, activity journal entries, data provenance, and tamper-proof machine learning records-thus tracking the entire historical provenance of a database of signals.

—Example Environment—

FIG. 1 illustrates one embodiment of a system 100 associated with ensuring that the results of machine learning models can be audited.

In one embodiment, the system 100 includes a time series data service 105 and an enterprise network 110 connected by a network 115 such as the Internet. The time series data service 105 is connected either directly to sensors (such as sensors 120) or remote terminal units (RTUs) through a network 125 or indirectly to sensors (such as sensors 130) or RTUs through one or one or more upstream devices 135. In one embodiment, networks 115 and 125 are the same network, and in another embodiment, networks 115 and 125 are separate networks.

In one embodiment, time series data service 105 includes various systems which may include a machine learning audit assurance system 140, a sensor interface server 145, a prognostics, anomaly discovery, and predictive maintenance system 150, a web interface server 155, and data store 160. Each of these systems 140-160 is interconnected by server side network 165. Each of these systems 140-160 are configured with logic, for example by various software modules, for executing the functions they are described as performing. In one embodiment, the systems 140-160 are implemented by dedicated computing devices. In one embodiment, one or more of the systems 140-160 may be implemented by a common (or shared) computing device, even though represented as discrete units in FIG. 1.

In one embodiment, time series data service 105 may be hosted by a third party, and/or operated by a third party for the benefit of multiple account owners/tenants, each of whom is operating a business, and each of whom has an associated enterprise network 110. In one embodiment, time series data service 105 is associated with a utility entity such as a power utility, or associated with a major utility asset such as a generation facility, substation, or other major power grid component. In one embodiment, time series data service 105 is configured with logic, such as software modules, to operate the time series data service 105 to (i) create and export time-series databases and/or (ii) audit a time series database in accordance with the systems and methods described herein.

In one embodiment, the sensors 120, 130 can be affixed to or otherwise configured to detect the performance of one or more components of a device or system. The devices or systems generally include any type of machinery or facility with components that perform measurable activities. The sensors 120, 130 may include (but are not limited to): a voltage sensor, a current sensor, a temperature sensor, a pressure sensor, a rotational speed sensor, a flow meter sensor, a vibration sensor, a microphone, an electromagnetic radiation sensor, a proximity sensor, a gyroscope, an inclinometer, an accelerometer, a global positioning system (GPS) sensor, a torque sensor, a flex sensor, a nuclear radiation detector, or any of a wide variety of other sensors or transducers for generating electrical signals that describe detected or sensed physical behavior.

In one embodiment, the sensors 120, 130 are connected through network 125 to sensor interface server 145. In one embodiment, sensor interface server 145 is configured with logic, such as software modules, to collect readings from sensors 120, 130 and store them as observations in a time series, for example in data store 160. The sensor interface server 145 is configured to interact with the sensors, for example by exposing one or more application programming interfaces (APIs) configured accept readings from sensors using sensor data formats and communication protocols applicable to the various sensors 120, 130. The sensor data format will generally be dictated by the sensor device. The communication protocol may be a custom protocol (such as a legacy protocol predating IoT implementation) or any of a variety of IoT or machine to machine (M2M) protocols such as Constrained Application Protocol (CoAP), Data Distribution Service (DDS), Devices Profile for Web Services (DPWS), Hypertext Transport Protocol/Representational State Transfer (HTTP/REST), MQ Telemetry Transport (MQTT), Universal Plug and Play (UPnP), Extensible Messaging and Presence Protocol (XMPP), ZeroMQ, and other communications protocols that can be carried by the transmission control protocol—internet protocol or user datagram protocol (TCP/IP or UDP) transport protocols. SCADA protocols such as OLE for Process Control Unified Architecture (OPC UA), Modbus RTU, RP-570, Profibus, Conitel, IEC 60870-5-101 or 104, IEC 61850, and DNP3 may also be employed when extended to operate over TCP/IP or UDP. In one embodiment, the sensor interface server 145 polls sensors 120, 130 to retrieve sensor readings. In one embodiment, the sensor interface server passively receives sensor readings actively transmitted by sensors 120, 130.

In one embodiment, enterprise network 110 may be associated with a utility entity such as a power utility. In one embodiment, enterprise network 110 may be associated with a regulatory entity, such as a government. For simplicity and clarity of explanation, the enterprise network 110 is represented by an on-site local area network 170 to which one or more personal computers 175, or servers 180 are operably connected, along with one or more remote user computers 185 that are connected to the enterprise network 110 through the network 115 or other suitable communications network or combination of networks. The personal computers 175 and remote user computers 185 can be, for example, a desktop computer, laptop computer, tablet computer, smartphone, or other device having the ability to connect to local area network 170 or network 115 or having other synchronization capabilities. The computers of the enterprise network 110 interface with time series data service 105 across the network 115 or another suitable communications network or combination of networks.

In one embodiment, remote computing systems (such as those of enterprise network 110) may access information or applications provided by the time series data service 105 through web interface server 155. For example, computers 175, 180, 185 of the enterprise network 110 may request a time-series database from time series data series data service 105. Or, for example, computers 175, 180, 185 of the enterprise network 110 may perform an audit of a time series database in accordance with the systems and methods described herein. In one embodiment, the remote computing system may send requests to and receive responses from web interface server 155. In one example, access to the information or applications may be effected through use of a web browser on a personal computer 175 or remote user computers 185. In one example, these communications may be exchanged between web interface server 155 and server 180, and may take the form of remote representational state transfer (REST) requests using JavaScript object notation (JSON) as the data interchange format for example, or simple object access protocol (SOAP) requests to and from XML servers.

In one embodiment, data store 160 includes one or more time-series databases configured to store and serve time series data received by sensor interface server 145 from sensors 120, 130. In one embodiment, the time-series database is an Oracle® database configured to store and serve time-series data. In some example configurations, data store(s) 160 may be implemented using a network-attached storage (NAS) device and/or other dedicated server device.

In one embodiment, upstream device 135 may be a third-party service for managing IoT connected devices. Or, in one embodiment, upstream device 135 may be a gateway device configured to enable sensors 130 to communicate with sensor interface server 145 (for example, where sensors 130 are not IoT-enabled, and therefore unable to communicate directly with sensor interface server 145).

—Example Method for ML Model Audit Assurance—

In one embodiment, each step of computer-implemented methods described herein may be performed by a processor (such as processor 1110 as shown and described with reference to FIG. 11) of one or more computing devices (i) accessing memory (such as memory 1115 and/or other computing device components shown and described with reference to FIG. 11) and (ii) configured with logic to cause the system to execute the step of the method (such as machine learning audit assurance logic 1130 shown and described with reference to FIG. 11). For example, the processor accesses and reads from or writes to the memory to perform the steps of the computer-implemented methods described herein. These steps may include (i) retrieving any necessary information, (ii) calculating, determining, generating, classifying, or otherwise creating any data, and (iii) storing any data calculated, determined, generated, classified, or otherwise created. References to storage or storing indicate storage as a data structure in memory or storage/disks of a computing device (such as memory 1115, or storage/disks 1135 of computing device 1105 or remote computers 1165 shown and described with reference to FIG. 11).

In one embodiment, each subsequent step of a method commences in response to parsing a signal received or stored data retrieved indicating that the previous step has been performed at least to the extent necessary for the subsequent step to commence. Generally, the signal received or the stored data retrieved indicates completion of the previous step.

Figure 2:
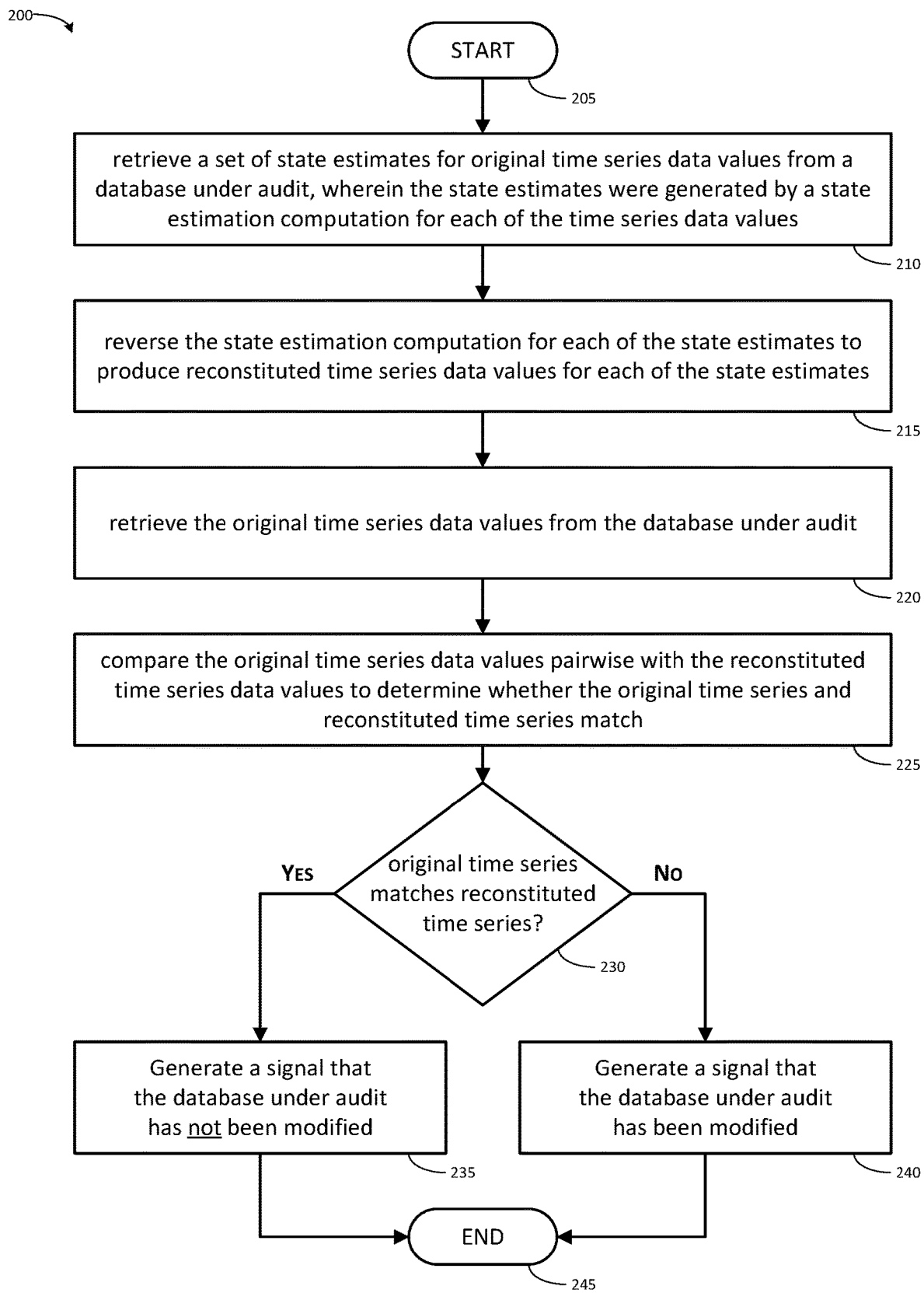
FIG. 2 illustrates one embodiment of a method associated with ensuring that the results of machine learning models can be audited.

FIG. 2 illustrates one embodiment of a method 200 associated with ensuring that the results of machine learning models can be audited. In one embodiment, the steps of method 200 are performed by machine learning audit assurance system 140 or any of computers 175, 180, 185 in enterprise network 110 (as shown and described with reference to FIG. 1). In one embodiment, machine learning audit assurance system 140 or any of computers 175, 180, 185 are special purpose computing devices (such as computing device 1105) configured with machine learning audit assurance logic 1130.

The method 200 may be initiated based on various triggers, such as receiving a signal over a network or parsing stored data indicating that (i) a user (or administrator) of time series data service 105 or of computers 175, 180, 185 has initiated method 200, (ii) method 200 is scheduled to be initiated at defined times or time intervals, (iii) a user (associated with a utility or a regulatory entity) of time series data service 105 or of computers 175, 180, 185 has requested an audit of a time series database, or (iv) some other trigger indicating that method 200 should begin. The method 200 initiates at START block 205 in response to parsing a signal received or stored data retrieved and determining that the signal or stored data indicates that the method 200 should begin. Processing continues to process block 210.

At process block 210, the processor retrieves a set of state estimates for original time series data values from a database under audit. The state estimates were generated by a state estimation computation for each of the time series data values. Thus, in one embodiment, ML audit assurance system 140 accesses ML estimates of the original time series data. Processing at process block 210 completes, and processing continues to process block 215.

At process block 215, the processor reverses the state estimation computation for each of the state estimates to produce reconstituted time series data values for each of the state estimates. In one embodiment, ML audit assurance system 140 generates the reconstituted time series data from the ML estimates of the original time series data. In one embodiment, the reconstituted time series data is generated by reversing the operations of a machine learning model that is trained for generating the ML estimates from the original time series data. Processing at process block 215 completes, and processing continues to process block 220.

At process block 220, the processor retrieves the original time series data values from the database under audit. In one embodiment, ML audit assurance system 140 accesses the original time series data for subsequent comparison with the reconstituted time series data. Processing at process block 220 completes, and processing continues to process block 225.

At process block 225, the processor compares the original time series data values pairwise with the reconstituted time series data values to determine whether the original time series and reconstituted time series match. For example, ML audit assurance system 140 determines a difference(s) or residuals between the original time series data and the reconstituted time series data. Processing at process block 225 completes, and processing continues to decision block 230.

At decision block 230, the processor evaluates whether the original time series matches the reconstituted time series. In one embodiment, ML audit assurance system 140 detects tampering or corruption in the original time series data based on the difference(s) between the original time series data and the reconstituted time series data. If the original time series matches the reconstituted time series (YES), processing at decision block 230 completes and processing continues to process block 235. If the original time series does not match the reconstituted time series (NO), processing at decision block 230 completes and processing continues to process block 240.

ML audit assurance system 140 then may generate an electronic verification report that indicates whether (or not) the tampering or corruption is detected in the original time series data. At process block 235, the processor generates a signal that the database under audit has not been modified because the original time series and reconstituted time series match. Processing at process block 235 completes, and processing continues to END block 245, where process 200 ends. And, at process block 240, the processor generates a signal that the database under audit has been modified because the original time series and reconstituted time series do not match. Processing at process block 240 completes, and processing continues to END block 245, where process 200 ends.

Each of the foregoing process blocks of method 200 is described in further detail elsewhere herein.

—Preparing to Reconstitute Original Time Series Data From MSET Estimates—

Figure 3:
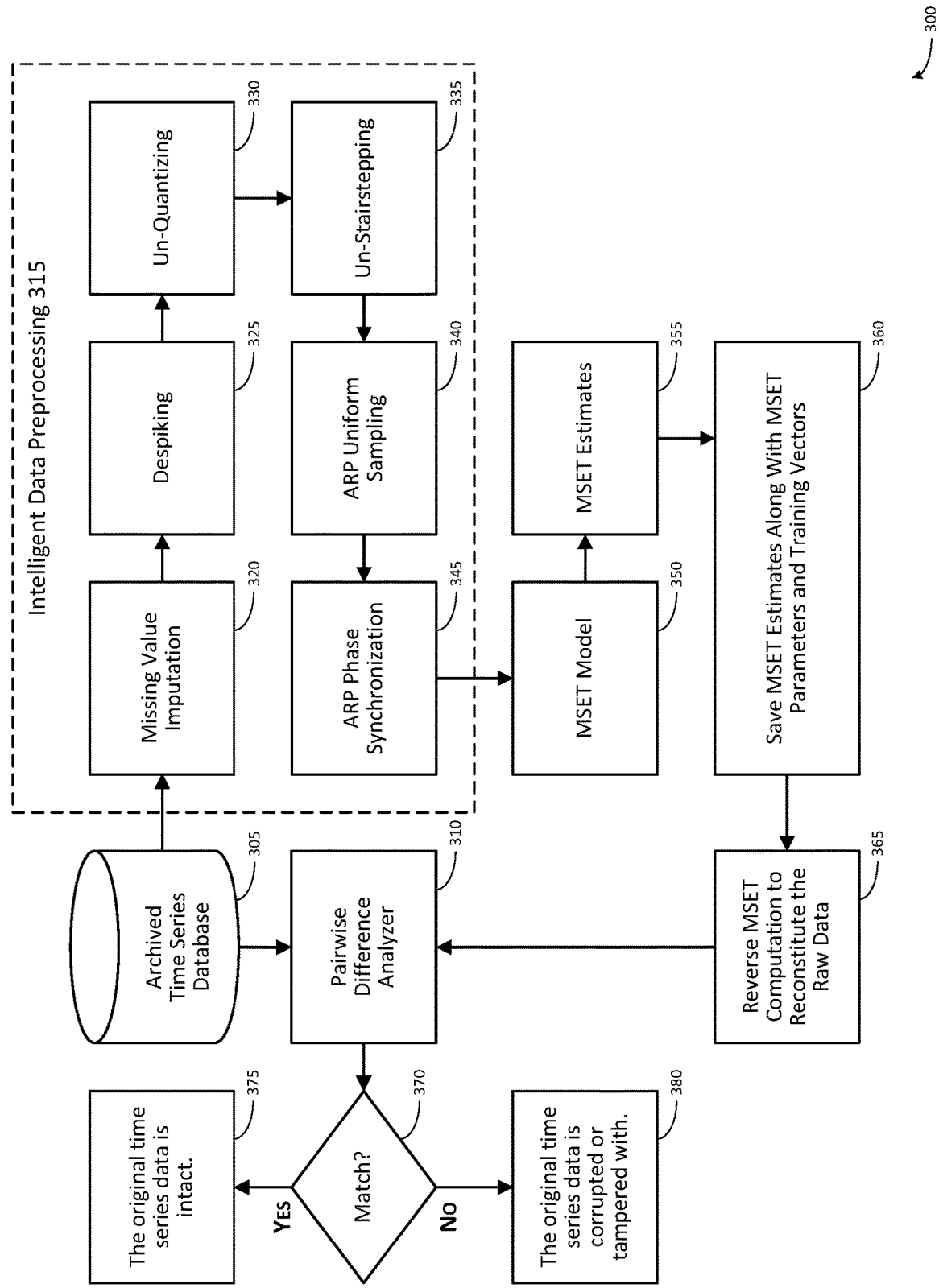
FIG. 3 illustrates a flowchart of one embodiment of an process associated with ensuring that the results of machine learning models can be audited.

FIG. 3 illustrates a flowchart of one embodiment of an auditability process 300 associated with ensuring that the results of machine learning models can be audited. MSET is incorporated in a data flow process, and the MSET operations are reversed to reconstitute the original time-series data for auditability. This figure demonstrates the auditability of this application of MSET.

In one embodiment, at a high level, the auditability process 300 starts when the system retrieves MSET estimates from a time-series database. Next, the system reverses the MSET computation to produce reconstituted time-series data from the MSET estimates. As discussed above, MSET is a reversible process, which means that performing the reverse MSET computation on the MSET estimates will reconstitute the original time-series data. The system then is given the original time-series data from the database being audited. Finally, the system compares the reconstituted time-series data with the original time-series data to certify that there has been no deliberate tampering (or accidental data corruption) in original time-series data if the comparison indicates a match.

As discussed in more detail above, actions described with reference to the auditability process 300 may be performed by a processor of one or more computing devices accessing memory, storage and/or other computing device components shown and described with reference to FIGS. 1 and 11.

In one embodiment, an archived time series database 305 is presented for audit to determine if the original time series data in the database is intact or if the original time series data in the database is corrupted or tampered with. The archived time series database 305 may include one or more time series signals, which is a sequence of time series values for all observations of a time series. The archived time series database 305 will be presented for pairwise difference analysis 310 between original time series data values from the archived time series database 305 and reconstituted time series values derived from MSET modeling of the archived database and MSET estimation of the values.

In one embodiment, archived time series database 305 is a snapshot of a database at a time when a change was made to the database. Additionally, at the time the change is made to the database, a journal entry describing the change is made, and a set of state estimates is created for later pairwise difference analysis 310 in the context of an audit of the archived time series database 305. In one embodiment, the set of state estimates is stored in association with the journal entry for the database under audit, archived time series database 305. For example, the set of state estimates may have been generated in response to one or more commands indicating a change to the database under audit, and stored in a data structure associated with a journal entry describing the change. Other metadata may also be stored in association with the journal entry, including provenance metadata that identify the data on which query results (that lead to the journaled change) are based.

Sensor disturbances including de-calibration bias, intermittent stuck-at faults, change-of-gain drifts, and episodic spikiness degrade signal quality and are a primary cause of false-alarms (Type-I errors) and missed-alarms (Type-II errors) in ML prognostics for IoT applications. The original time series data values in the archived time series database 305 may include some of these sensor disturbances. In one embodiment, the archived time series database 305 is subjected to a series of intelligent data preprocessing 315 steps to cleanse the data and prepare it for MSET modeling and estimation. The preprocessing serves to mitigate the undesirable effects of the sensor disturbances. In one embodiment, the intelligent data preprocessing 315 is iterated for one or more time series included in the archived time series database 305.

In one embodiment in the intelligent data preprocessing 315, all observations from all signals in archived time series database 305 are first preprocessed and then optimally re-sampled and "harmonized," for example by using the Oracle® analytical resampling process (ARP), to produce an updated database of cleansed and optimally re-sampled/synchronized signals. In one embodiment, the ARP may involve one or more of the techniques described in "Automated Analytic Resampling Process for Optimally Synchronizing Time-Series Signals", inventors K. C. Gross and G. C. Wang, U.S. patent application Ser. No. 16/168,193, filed Oct. 23, 2018, which is hereby incorporated by reference herein in its entirety.

In one embodiment, the archived time series database 305 undergoes a missing value imputation process 320 during the intelligent data preprocessing 315. For each time series signal in the archived time series data base 305, the missing value imputation process 320 parses the original time series signal with a missing value check. In response to parsing a missing value in the time series, the missing value imputation process 320 fills in the missing value with an estimated value. In one embodiment, the estimated value is a simple interpolation. In one embodiment, the estimate is a highly accurate estimate based on MSET-derived serial correlation and cross-correlations with the existing values, rather than a simple interpolation. The updated, filled-in time series is stored for future processing. The missing value imputation process 320 may also store a record of the locations of missing values in the time series that have been filled with an estimate for later reversal. In one embodiment, the ARP may involve one or more of the techniques described in "Missing Value Imputation to Facilitate Prognostic Analysis of Time-Series Sensor Data", inventors G. C. Wang, K. C. Gross, and D. Gawlick, U.S. patent application Ser. No. 16/005,495, filed Jun. 11, 2018, which is hereby incorporated by reference herein in its entirety.

In one embodiment, the intelligent data preprocessing 315 includes a despiking process 325. In one example, the despiking process 325 may occur after missing values in the original time series are replaced by the missing value imputation process 320. In the despiking process 325, the updated timeseries signals are parsed through an outlier check to detect and remove data "spikes," abrupt, short-lived variations that do not represent accurate sensor readings. The outlier check detects the spikes in the signals by iteratively characterizing (generating descriptive parameters to describe the characteristics and behavior of) a variety of statistical distributions for the signals. Time series data values that are outliers based on these characterizations are flagged as data value spikes. The captured spikes are replaced temporarily with the signal average. The updated, despiked time series is stored for later processing. The despiking process 325 may also store a record of the value and location within the time series of the detected spikes. In one embodiment, the despiking process 325 may involve one or more of the techniques described in "Synthesizing High-Fidelity Signals with Spikes for Prognostic Surveillance Applications", inventors G. C. Wang and K. C. Gross, U.S. patent application Ser. No. 16/215,345, filed Dec. 10, 2018, which is hereby incorporated by reference herein in its entirety.

In one embodiment, the intelligent data preprocessing 315 includes an un-quantizing process 330. For example, the un-quantizing process 330 may occur after data spikes are detected and removed from the time series by the despiking process 325. In the un-quantizing process 330, the updated signals are parsed through a "quantization" check to determine whether data quantization-a lossy data compression technique in which intervals of data are grouped or binned into single representative values—has caused signal values to switch rapidly and repeatedly between adjacent representative values. In other words, the quantization check identifies sections of the time series where the observation points bounce back and forth between a certain numbers of observation caps. Data quantization can be caused by caused by low-resolution "quantized" transducers or sensors. The un-quantizing process 330 then converts quantized values detected in the time series to high-accuracy continuous signals. These continuous signals are very close approximations to what the signal values would have been if they had been detected using higher resolution transducers. The updated, un-quantized time series is stored for later processing. The un-quantizing process 330 may also store a record of the values and location within the time series of the detected quantized values. In one embodiment, the un-quantizing process 330 may involve one or more of the techniques described in "Dequantizing Low-Resolution IOT Signals to Produce High-Accuracy Prognostic Indicators", inventors M. Li and K. C. Gross, U.S. Pat. No. 10,496,084, granted Dec. 3, 2019, which is hereby incorporated by reference herein in its entirety.

In one embodiment, the intelligent data preprocessing 315 includes an un-stairstepping process 335. For example, the un-stairstepping process 335 may occur after quantized values are detected and replaced in the time series by the un-quantizing process 330. Stairstepping results from a mismatch in sampling rates between recording systems and detection systems where the slower sampling rate signals simply repeat their last measured values at a higher sampling rate, so that all measured signals result in a uniform sampling rate. The time series values for slower sampling rate sensors have sequences of flat segments, resembling stair steps. Stairstepping is a common problem with commercial data historical archives that use a simple algorithm for collecting low sampling rate data into higher sampling rate time series. In one embodiment, the un-stairstepping process 335 parses the time series to identify any stairstepped values present. The un-stairstepping process 335 "fills in" the stairstepped portions of the signals with the higher-sampling rate signals. The higher sampling rate signal values may be derived, in one embodiment, using MSET estimates. The updated, filled-in time series is stored for future processing. The un-stairstepping process 335 may also store a record of the values and location within the time series of the detected stairstepped values for later reversal. In one embodiment, the un-stairstepping process 335 may involve one or more of the techniques described in "Replacing Stair-Stepped Values in Time-Series Sensor Signals With Inferential Values to Facilitate Prognostic Surveillance Operations", inventors K. C. Gross and G. C. Wang, U.S. patent application Ser. No. 16/128,071, filed Sep. 11, 2018, which is hereby incorporated by reference herein in its entirety.

In one embodiment, the intelligent data preprocessing 315 includes a uniform sampling process 340. In one embodiment, uniform sampling process 340 may occur after stairstepped values are detected and replaced in the time series by the un-stairstepping process 335. In the uniform sampling process 340, the signals are parsed with a sampling rate check to identify whether the sampling rates of signals differ. If the signals exhibit different sampling rates (such as having a different number of observations over the same period of time), then the observations of the slower signals will be resampled to match the highest sampling rate of the signals. The updated, resampled time series is stored for future processing. The uniform sampling process 340 may also store a record of the original, un-resampled values and their placement within the time series for later reversal.

In one embodiment, the intelligent data preprocessing 315 includes a phase synchronization process 345. For example, phase synchronization process 345 may occur after the uniform sampling process 340. Or, in one embodiment, phase synchronization process 345 may occur in parallel with the uniform sampling process 340. In the phase synchronization process 345, the updated signals are parsed through a correlation check to detect out-of-phase observations. Out-of-phase observations (or time-signal values that are associated with an incorrect time index in the time series) may be due to, for example, clock synchronization disparities in measurement instrumentation such as sensors. The phase synchronization process 345 shifts the out-of-phase values in the time domain to align them with the correct time index. The updated, phase-synchronized time series is stored for future processing. The phase synchronization process 345 may also store a record of the original placement of the out-of-phase values within the time series for later reversal.

In one embodiment, one or more of the uniform sampling process 340 and phase synchronization process is performed using the Oracle® analytical resampling process (ARP), and may involve one or more of the techniques described in "Automated Analytic Resampling Process for Optimally Synchronizing Time-Series Signals," incorporated by reference above. Note that signal sampling may vary between time series signals in the archived time series database 305. For example, one time series may have a high, but regular sampling rate or interval between observations. Another time series may have a low, but regular sampling rate or interval between observations. Another time series may have an irregular or uneven interval between observations. In one embodiment, the phase of time series signals may be adjusted so that a set of time series signals in the archived time series database 305 are aligned with respect to observation time. In one embodiment, the data values of a time series signal may be re-sampled at new sampling interval by interpolating estimated data values for observations at the new sampling interval within the time series signal. This may be performed for multiple synchronized time series signals to result in a common sampling interval for the time series signals.

The six intelligent data preprocessing 315 procedures described above result in a high-quality, "cleansed" or "enhanced" version of archived time series database 305 that may be stored and then retrieved and used to for subsequent machine learning processes. Note that other data preprocessing techniques may also be applied, or fewer than all six of these techniques may be performed in the intelligent data preprocessing 315. All observations from all signals are now preprocessed and optimally re-sampled and "harmonized" using ARP.

The intelligent data preprocessing 315 procedures correct common issues in a typical machine learning dataset. But, each of the steps modifies some of the original data. A record should be kept for each modification so that the original data can be reconstructed. As mentioned in discussion of each of the six intelligent data preprocessing 315 procedures above, each procedure will store a record indicating the changes to the data set. In one embodiment, the change records for all the intelligent data preprocessing 315 procedures applied to the archived time series database 305 will be stored in a single electronic data structure called an intelligent data preprocessing (IDP) model.

Figure 4:
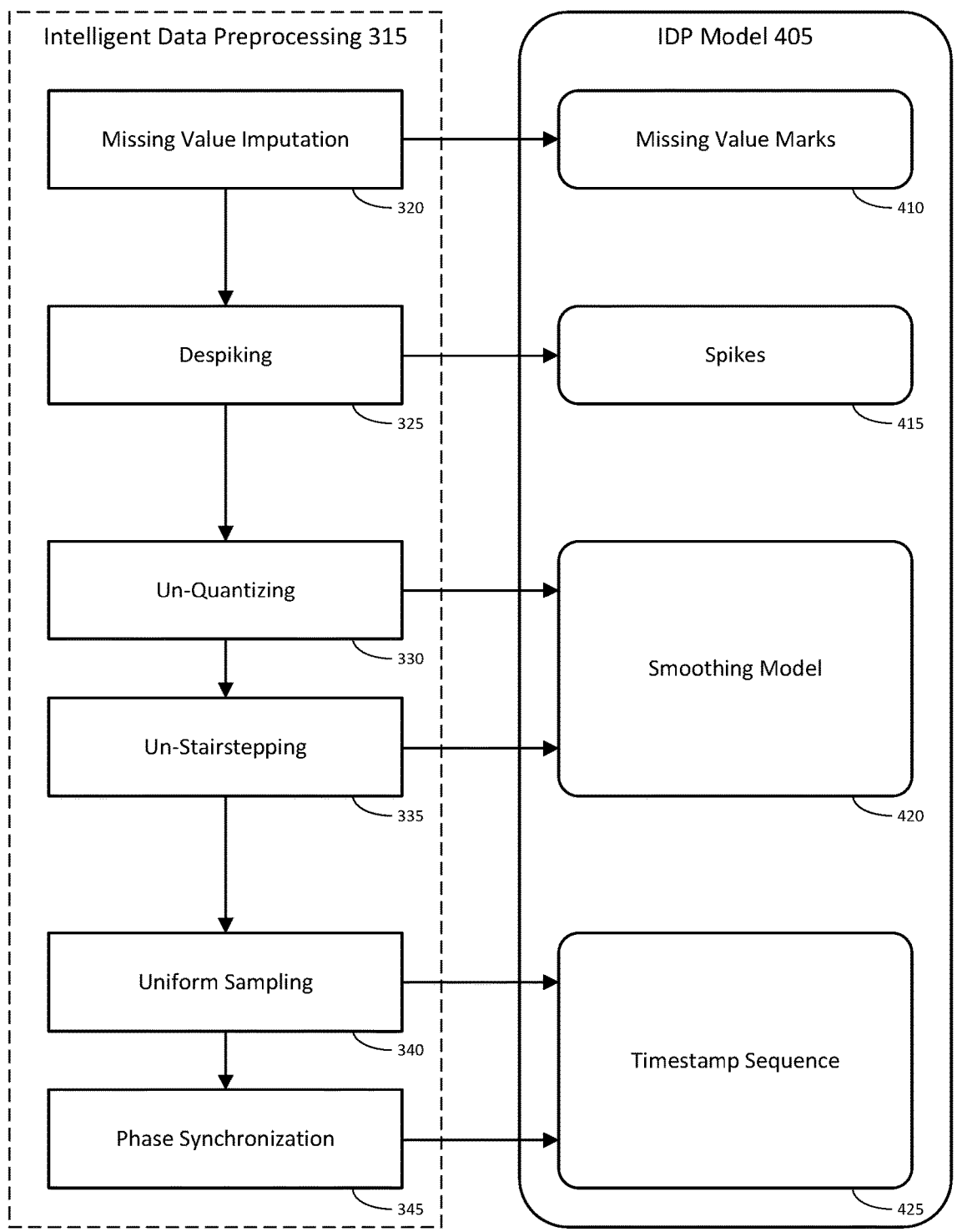
FIG. 4 illustrates a schematic of one embodiment of storing change records from intelligent data preprocessing in an example IDP model.

Referring now to FIG. 4, FIG. 4 illustrates a schematic 400 of one embodiment of storing change records from intelligent data preprocessing 315 in an example IDP model 405. IDP model 405 is a complete, ordered record of every action performed on the archived time series database in preparation for machine learning operations.

Missing value imputation process 320 stores the record (also referred to as a mark or marker) of the locations of missing values in the time series that have been filled with an estimate in a missing value marks data structure 410 in IDP model 405. In one embodiment, the missing value marks data structure includes a set of arrays associated with time series in the archived time series database 305. There is a missing value marks array associated with each time series with missing values in the archived time series database 305. The missing value marks array may be an array of observation index (such as time) values, where each index or time value indicates an observation in the associated time series where a missing value was filled in with an estimated value.

Despiking process 325 stores the record of the value and location within the time series of the detected spikes in a spikes data structure 415 in IDP model 405. In one embodiment, the spikes data structure includes a set of arrays associated with time series in the archived time series database 305. There is a spikes array associated with each time series in which spikes were detected. The arrays may be arrays of tuples including an observation index value (such as time) and an associated amplitude value of the spike (that is, the erroneous sensor reading value) at that observation.

Un-quantizing process 330 stores the record of the values and location within the time series of the detected quantized values in a smoothing model data structure 420 in IDP model 405. In one embodiment, the smoothing model 420 includes a set of quantized observations arrays associated with time series in the archived time series database 305. There is a quantized observations array associated with each time series in which quantized values were detected. The arrays may be arrays of tuples including an observation index value (such as time) and an associated quantized value at that observation.

Un-stairstepping process 335 stores the record of the values and location within the time series of the detected stairstepped values in the smoothing model data structure 420. In one embodiment, the smoothing model 420 includes a set of stairstepped observations arrays associated with time series in the archived time series database 305. There is a stairstepped observations array associated with each time series in which stairstepped values were detected. The arrays may be arrays of tuples including an observation index value (such as time) and an associated stairstepped (original or not yet un-stairstepped) value at that observation. In one embodiment, the quantized observations array and stairstepped observations array are a single array containing all the original quantized and stairstepped values indexed by their locations within the time series. In this situation, the un-stairstepping process may stairstepped value tuples into quantized observations arrays created by the un-quantizing process 330.

Uniform sampling process 340 stores the record of the original, un-resampled values and their placement within the time series in a timestamp sequence data structure 425 in IDP model 405. Also, phase synchronization process 345 stores the record of the original placement of the out-of-phase values within the time series in the timestamp sequence data structure 425. In one embodiment, the timestamp sequence data structure 420 includes a set of timestamp arrays associated with time series in the archived time series database 305. There is a timestamp array observations array associated with each time series in which out-of-phase observations were detected. The arrays include an observation index value (such as time) for each observation of the time series. In one embodiment, there is a timestamp array created for both uniform sampling process 340 and phase synchronization process 345. This may be the case where the processes are performed sequentially. Where the uniform sampling process 340 and phase synchronization process 345 are performed together, the results may be stored together in single timestamp arrays.

Thus, in one embodiment, a processor preprocesses the original time series values to mitigate effects of sensor disturbances on quality of the original time series values, as shown in intelligent data preprocessing 315. Over the course of that intelligent data preprocessing, the processor generates a data preprocessing model that records one or more changes to the original time series values during the preprocessing, as shown for example by IDP model 405. In one embodiment, the reversal of the state estimation computation described with reference to process block 215, FIG. 2 also includes retrieving the data preprocessing model, such as IDP model 405, from storage or memory; and reversing the preprocess described by the data preprocessing model for each of the state estimates.

Each of the six intelligent data preprocessing 315 procedures described above may be reversed or otherwise undone by retrieving the original time series values retained in IDP model 405 and replacing the corresponding enhanced values in the enhanced time series database with the original values. In one embodiment, the reversal processes for the various processes of the intelligent data preprocessing 135 are performed in a reverse order from the order in which the intelligent data preprocessing 135 processes were performed.

—Model Training—

Figure 5:
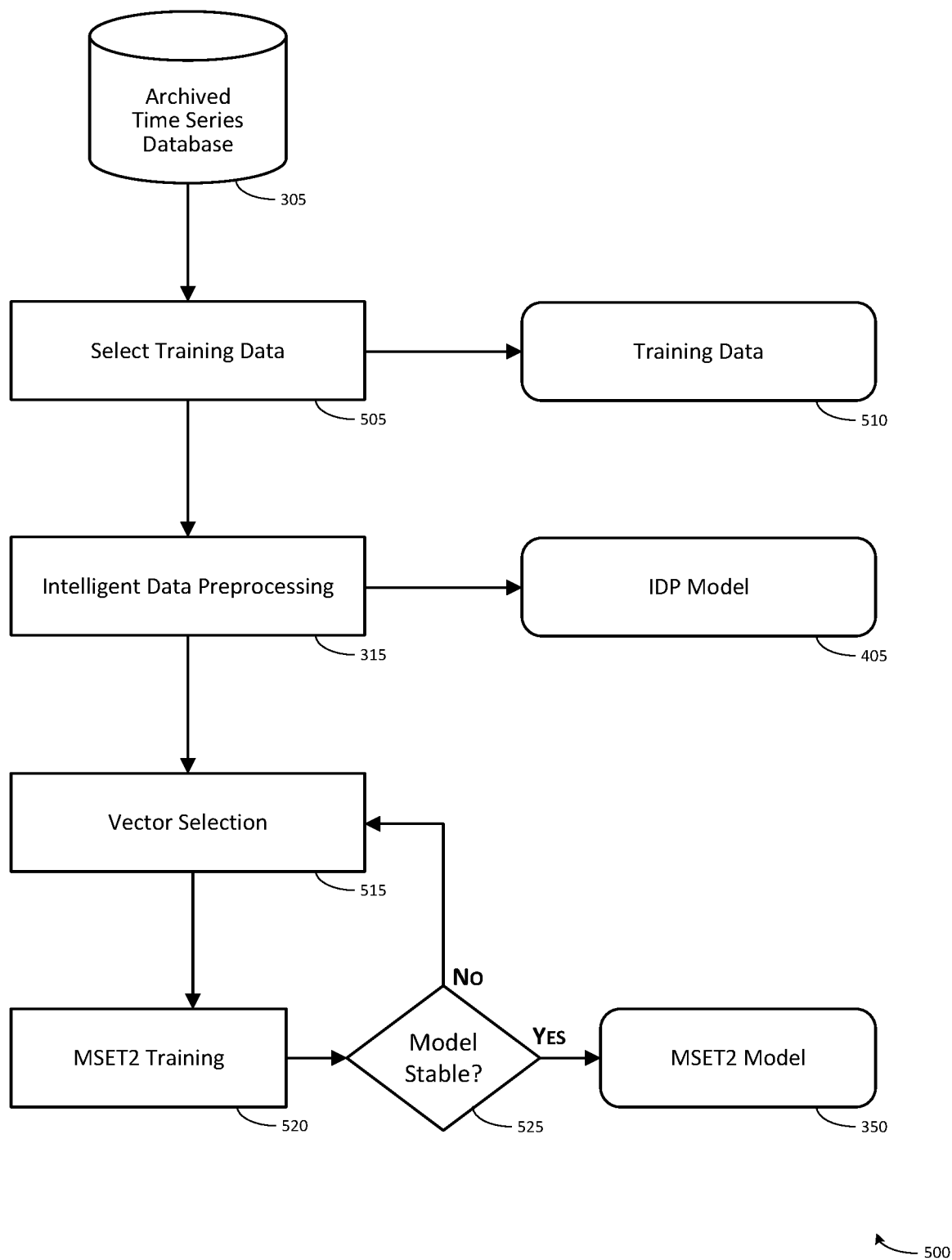
FIG. 5 illustrates a schematic of one embodiment of an MSET model training process associated with ensuring that the results of machine learning models can be audited.

Referring again to FIG. 3, following the intelligent data preprocessing 315, the enhanced time series signals are used to train an MSET model 350. FIG. 5 illustrates a schematic of one embodiment of an MSET model training process 500 associated with ensuring that the results of machine learning models can be audited. Archived time series database 305 is provided to a select training data process 505. In the select training data process 505, data is selected from the time series data to form a training data set. In one embodiment, a subset of the observation vectors of the time series is selected to form the training set. The selected training data set is then stored in a training data structure 510.

In one embodiment, as discussed above, archived time series database 305 is a tamper-proof data set that was captured (and archived) in response to an update(s) to the time series data. For example, archived time series database in is captured in an activity journal in association with the update. An MSET model trained with time series data that precedes an update to a time series database may be used to detect when tampering or corruption occurs in time series data that follows the update to the time series database. Therefore, in one embodiment, selection of training data 505 selects a training data set for the MSET model from time series data that was captured prior to an update to the time series database that may include tampering or corruption.

Once the selection of the training data 505 is complete and stored in training data structure 510, the intelligent data preprocessing 315 is commenced, and the IDP model 405 is created and stored, as described above with reference to FIGS. 3 and 4. In one embodiment, the selection of the training data 505 precedes the intelligent data preprocessing 315, and the training data is selected from the unenhanced data. In another embodiment, the selection of the training data 505 follows the intelligent data preprocessing 315, and the training data is selected from the enhanced data.

Once the selection of the training data 505 and the intelligent data preprocessing 315 are complete, a training vector selection process 515 and MSET model training process 520 loop is commenced. At vector selection, a set of training vectors is selected from the training data to provide to the MSET model for training. For example, 50 or 100 vectors may be selected. In one embodiment, the preprocessed training data is split into two parts to improve the model. For example, even numbered observations may form a first part of the training set, and odd numbered observations may form a second part of the training set. During iterations of the selection process, the set of training vectors is selected from the odd numbered observations and then from the even numbered observations in an even/odd "hopscotch" vector selection. As mentioned above, training an MSET model such as MSET model 350 is a deterministic mathematical procedure. The MSET training 520 uses time series signals that are representative of the time series recorded in the archived time series database to learn the correlations between the time series signals.

The MSET model training process 520 uses the enhanced signals to identify all signals in the archived time series database 305 that have any degree of association with any other signals in the archived time series database 305. In one embodiment, identification of associations between signals is performed both for the full universe of signals in archived time series database 305 as a whole, and also performed separately for clusters of signals. This empirical clustering approach recognizes that the archived time series database 305 of signals may have come from separate systems in a utility entity's facility, or separate assets in a utility entity's fleet of utility devices and systems. The final output of the MSET training process 520 is a trained MSET model 350. In one embodiment, the training process is an MSET2 training process, and the MSET model is an MSET2 model.

In one embodiment, the vector selection 515 and MSET training process 520 may be repeated in a loop (of one or more iterations) until MSET model 350 stabilizes, as indicated at decision block 525. If the MSET model 350 does not change much with a change to the training data set, the model 350 is stable (YES), and the training is complete, and the trained MSET model 350 is stored as a data structure for further use. If the MSET model 350 still changes significantly when the training data set is changed, the model 350 is not yet stable (NO), and an additional set of training vectors are selected at 515, and the MSET model 350 further trained with the additional set of training vectors at 520. Thus, in one embodiment, the MSET machine learning model is trained to generate estimates that are consistent with correlation patterns learned between time series signals of the training data set.

Referring again to FIG. 3, the trained MSET model 350 is used to compute MSET state estimates 355 of each signal in the archived time series database 305, based upon the empirical correlation patterns learned during model training 520 between each signal and other signals in the archived time series database 305. The MSET estimates are highly accurate, although the degree of accuracy may differ based on the extent of the training of the MSET model.

At process block 360, the MSET estimates, MSET parameters, and training vectors are saved to a report data structure. This report data structure may be associated in a database or data structure with a journal entry describing a change to the archived time series database 305. (For example, a change that resulted in the archived state of the archived time series database). In one embodiment, process blocks 320 through 355 are initiated and performed in response to the change to the archived time series database in order to be included alongside the journal entry describing the change, in order to ensure that data tampering in the archived time series database 305 is detectable. In one embodiment, activity journal metadata describing one or more queries preceding the change and provenance metadata describing the data underlying the query results is stored along with the journal entry and the report data structure.

Note that a report may be generated in response to any change to the database under audit, creating a trail of tamper-proof data sets associated with each change to the database. Thus, both the historical provenance information (including the change, the activity journal describing activity that preceded the change, and the provenance information describing the basis of the information presented in response to queries associated with the change) and a record for reconstructing the original data are recorded at each journal entry. Thus, the complete history of the database under audit is recorded and can be reviewed for audit. Further, the record is far more compact than maintaining an additional snapshot of the database, resulting in a significant performance improvement and improved portability of the data used for audit.

In one embodiment, the MSET estimates 355 are stored along with the original raw signals (the MSET parameters) in archived time series database 305. Also stored in archived time series database 305 are "sensor operability flags", with "1" for fully validated, or "0" for signals for which anomalies were discovered in the sensor that measured the original raw signal. In one embodiment, these sensor operability flags are determined based on the results of fault detection estimation using a sequential probability ratio test (SPRT) to analyze the residual between the MSET estimate and original raw signal value, and label the value as either anomalous or non-anomalous. Where a threshold number of anomalous values occur in the time series data for a particular sensor, the sensor may be flagged as partially or completely inoperable ("0") in the time series. The inoperable flag may indicate signals from failing or degrading sensors/transducers, stuck-at faults, or intermittent problems with sensors/transducers or upstream data collection electronics or networks. Where a number of anomalous values occurring in the time series data for a particular sensor do not exceed the threshold number, the sensor may be flagged as validated as operable ("1") in the time series. In one embodiment, the threshold may be as low as meeting or exceeding one anomalous reading in the time series, or may be higher as appropriate. In one embodiment, the threshold may be set by machine learning analysis of the time series, such as MSET analysis. In one embodiment, these flags may be set in a data structure including the time series.

—Model Limiting—

Figure 6:
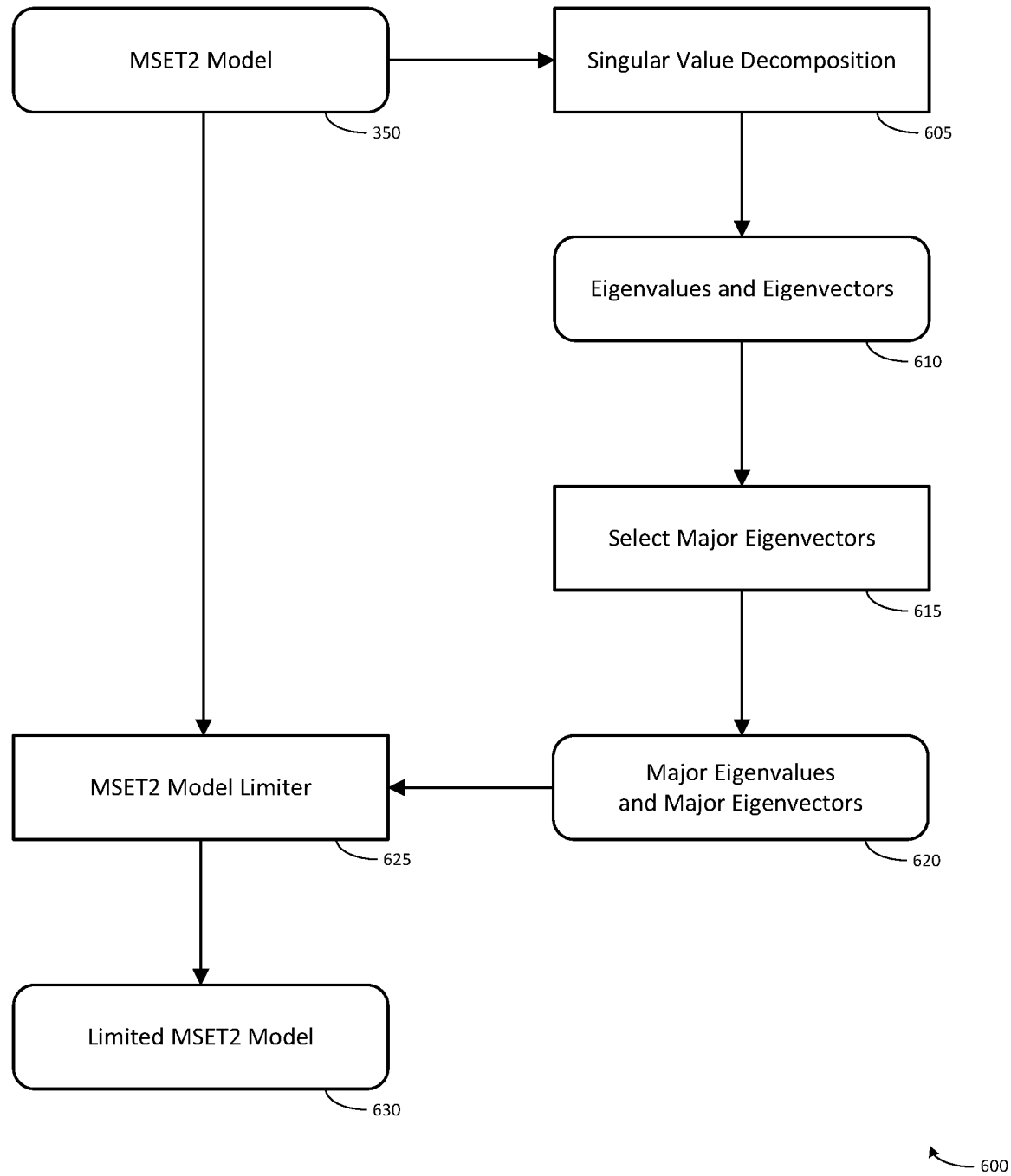
FIG. 6 illustrates a schematic of one embodiment of an MSET model limiting process associated with ensuring that the results of machine learning models can be audited.

In some examples, the trained MSET model 350 may not be very compact. Thus, for portability, it may be desirable to limit the size of the MSET model 350. Referring now to FIG. 6, FIG. 6 illustrates a schematic of one embodiment of an MSET model limiting process 600 associated with ensuring that the results of machine learning models can be audited.

In one embodiment, the system initially trains a multivariate state estimation model, such as MSET model 350, with a set of training values selected from the original time series values, for example as shown and described with reference to FIG. 5. The complexity of the trained multivariate state estimation model may be reduced by principal component analysis of a matrix for the trained multivariate state estimation model, and limiting the trained multivariate state estimation model to major components of the matrix. For example, MSET model 350 may be reduced by principal component analysis of the model 350's MSET matrix, and limiting the model 350 to major components of the matrix. Note that the MSET model consists of more than just the MSET matrix, but the MSET matrix is central to the MSET algorithm. As above, the MSET model 350 may be an MSET2 model.

In one embodiment, the system decomposes the matrix associated with the multivariate state estimation module into a set of eigenvectors. For example, the complexity of the MSET model 350 is reduced by performing a singular value decomposition (SVD) 605 of the MSET matrix included in the MSET model 350. In one embodiment, the SVD 605 consists of a sequence of eigenvectors and their associated eigenvalues. In one embodiment, the eigenvectors resulting from the SVD 605 are sorted in decreasing order by their respective associated eigenvalues. The system then stores the sorted sequence of eigenvectors and their associated eigenvalues 610, for example as an SVD data structure for further processing.

In one embodiment, the system selects a subset of major eigenvectors from the set of eigenvectors stored in the SVD data structure. For example, the system selects the major eigenvectors 615 from the SVD 605 based on the sorted eigenvectors and eigenvalues 610. The eigenvectors with the largest eigenvalues are the major eigenvectors. These major eigenvectors account for the greatest variability in sensor data over the time series, and are therefore the most informative for state estimation modeling. In one embodiment, the processor selects the "top" N eigenvectors having the largest associated eigenvalues to be the major eigenvectors with their associated major eigenvalues 620. The processor then deletes all eigenvectors and eigenvalues in the SVD data structure except for the top N eigenvectors, removing all eigenvectors (along with their associated eigenvalues) that are not major eigenvectors.

In one embodiment, the system creates a "limited" multivariate state estimation model from the subset of major eigenvectors. For example, the retained top N major eigenvectors and their associated major eigenvalues 620 are provided to an MSET model limiter 625. The MSET model 350 is also provided to the MSET model limiter 625. The MSET module limiter 625 operates to limit the MSET model 350 to the top N major eigenvectors and their eigenvalues 620. This substantially reduces the amount of data required for encoding the results of the MSET algorithm. In one embodiment, the MSET model limiter 625 constructs a limited MSET matrix from the major eigenvectors and associated eigenvalues 620. The model limiter 625 replaces the original MSET matrix in MSET model 350 with the limited MSET matrix to create a limited MSET model 630. The limited MSET model 630 is stored as a data structure in memory or storage.

Referring again to FIG. 2, in one embodiment, the reversal of the state estimation computation also includes generating the reverse of a computation by which the limited multivariate state estimation model (such as limited MSET model 630) forms state estimates.

—Data Compression—

Figure 7:
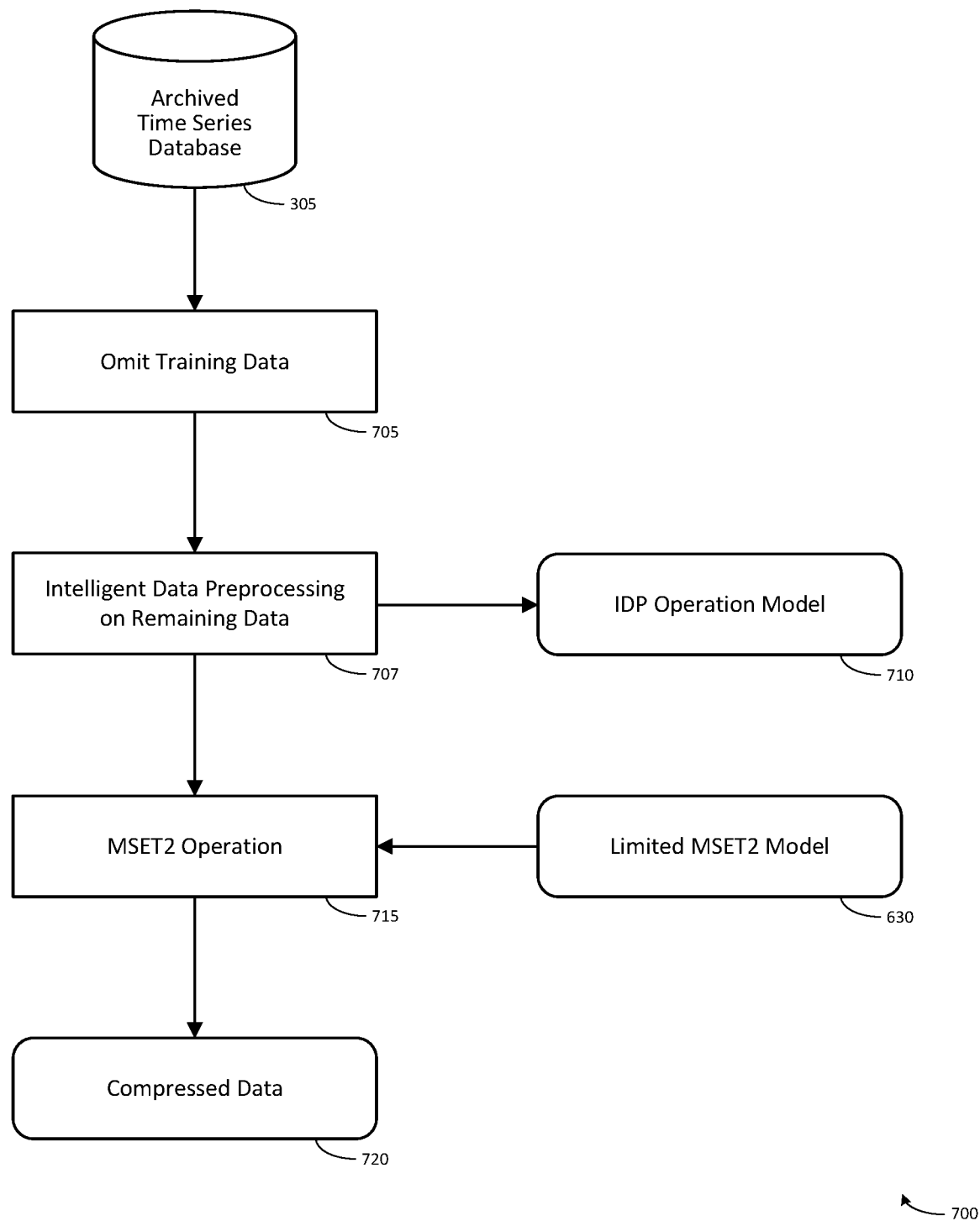
FIG. 7 illustrates a schematic of one embodiment of a data compression process associated with ensuring that the results of machine learning models can be audited.

In some examples, the full archived time series data base 305 may be very large. Thus, for portability, it may be desirable to limit the size of the database to the parameters of the limited MSET model 630. FIG. 7 illustrates a schematic of one embodiment of a data compression process 700 associated with ensuring that the results of machine learning models can be audited. In data compression process 700, archived time series database 305 is reduced to a minimal size suitable for audit of the uncompressed or original archived time series database 305.

In one embodiment, at process block 705, the system omits training data values from the original time series values in the database under audit, archived time series database 305. For example, in one embodiment, the system creates a copy of the archived time series database 305 that does not include training data used to train an MSET model. In one embodiment, training data for an MSET model, such as training data 510 for MSET model 350, is removed from the copy of the archived time series database 305. For example, all observation records used for training MSET model 350 may be deleted from the copy of the archived time series database 305. In another embodiment, the copy of the archived time series database 305 is initially created without the training data, avoiding the need to delete it. The system stores the reduced copy of the archived time series database for subsequent processing.

In one embodiment, at process block 707, the system preprocesses the remaining original time series data values to mitigate the effects of sensor disturbances and generating a model that records the changes to the remaining original time series data. For example, the intelligent data preprocessing 315 (as described above) may be performed for the reduced copy of the archived time series database 305. The system forms an IDP operation model 710 similar to IDP model 405, where the IDP operation model 710 is only for the remaining observation records remaining in the reduced copy of the archived time series database 305 after the training observations were omitted. The system stores the pre-processed, reduced copy of the archived time series database for subsequent processing.

In one embodiment, at MSET operation block 715, the system performs state estimation (such as MSET state estimation) for the preprocessed, remaining original time series data values using the limited multivariate state estimation model to create a compressed time series database. The limited MSET model 630 and the copy of the archived time series database 305 with the training data omitted are used to perform the MSET operation 715. In one embodiment, as described above, the MSET operation 715 and limited MSET model 630 are an MSET2 operation and an MSET2 model. The MSET operation 715 (i) forms a state estimate for each observation based on the remaining parameters, and (ii) removes from the copy of the archived time series database those time series variables that are not parameters of the limited MSET model 630. Thus, data values that do not inform MSET state estimation (data values that do not significantly affect the value of the MSET state estimation) are deleted from the copy of the archived time series database, further reducing the size of the data. The MSET state estimates formed for each observation and the remaining parameter values for each observation form compressed data 720. The compressed data 720 is stored as a data structure in memory or storage.

Thus, in one embodiment, once the archived time series database is preprocessed, the MSET algorithm is performed using the limited MSET model 630. The limited MSET model 630 along with the MSET parameters for the limited MSET model 630 constitutes a compressed version of original time series database (compressed data 720). The MSET estimates along with the MSET model are stored, representing the original timeseries data in reduced size. In the event there is a need to identify if any of the original raw data streams were modified, altered, or substituted, the system will be able to reverse the stored MSET estimates and the MSET model to reconstitute the original timeseries data, which can then used to validate or invalidate purported original time series data, as discussed below.

—Data Formats—

Figure 8B:
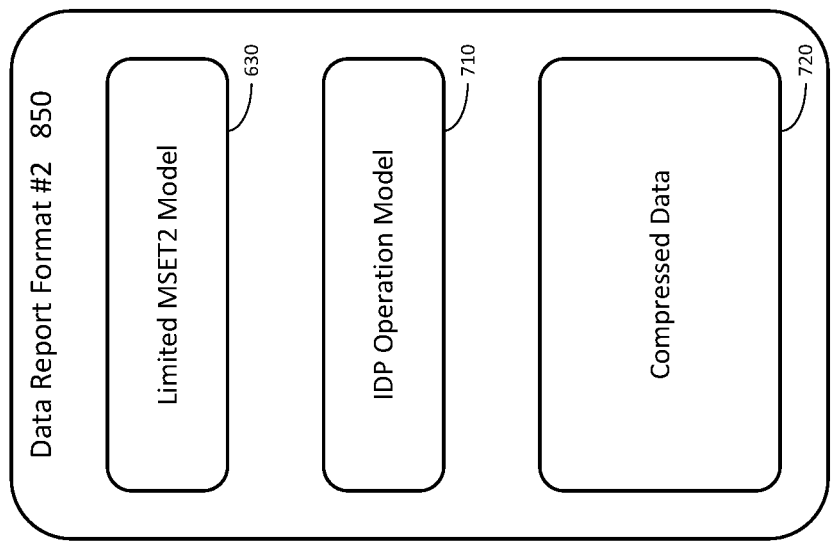
FIG. 8B illustrates a second example data report format resulting from another embodiment of a data compression process.
Figure 8A:
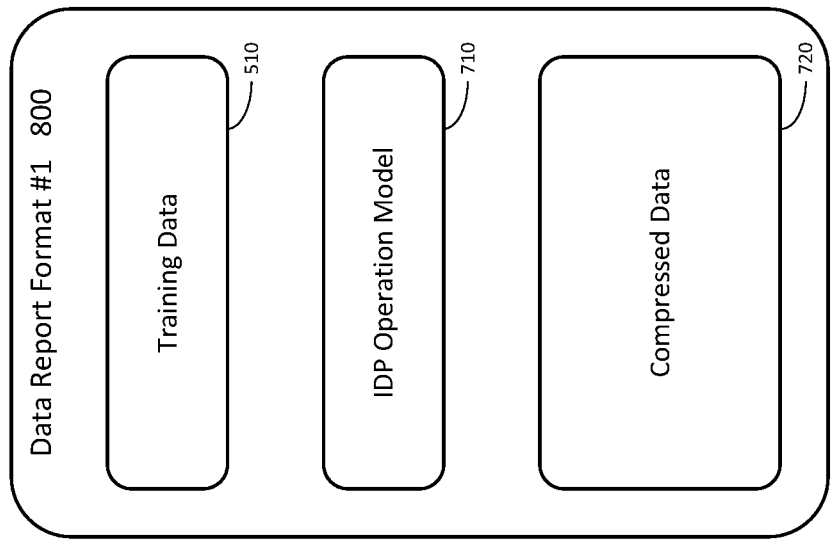
FIG. 8A illustrates a first example data report format resulting from one embodiment of a data compression process.

FIGS. 8A and 8B illustrate two example data report formats. Each of these two formats contain sufficient information to perform an audit of the database under audit, such as original archived time series database 305. In one embodiment, the system generates an electronic data report data structure following one of the two example data report formats.

In one embodiment, the system generates an electronic data report data structure that includes a preprocessing model that records one or more changes to the original time series values during preprocessing to mitigate effects of sensor disturbances on quality of the original time series values; a compressed time series database generated by performing state estimation with a limited multivariate state estimation model trained with a set of training values selected from the original time series values and excluding from the compressed time series database those values that are not parameters of the limited multivariate state estimation model; and one or more of (i) the set of training values and (ii) the limited multivariate state estimation model.

Comparing the two formats, the first data report format 800 specifies (that is, includes in the data report) all the training data 510 (and not the limited MSET2 model 630), while the second data report format 850 specifies the limited MSET2 model 630 (and not the training data 510). Both the first data report format 800 and the second data report format 850 formats specify the IDP operation model 710 and compressed data 720.

Thus, in one embodiment, the electronic data report data structure includes a preprocessing model (IDP operation model 710) that records one or more changes to the original time series values during preprocessing to mitigate effects of sensor disturbances on quality of the original time series values (as shown and described with reference to FIGS. 3, 4 and 7). The electronic data report data structure also includes a compressed time series database (compressed data 720) generated by performing state estimation with a limited multivariate state estimation model and excluding from the compressed time series database those values that are not parameters of the limited multivariate state estimation model (ash shown and described with reference to FIG. 7). The electronic data report data structure also includes one or more of (i) a set of training values selected from the original time series values and used to train the limited multivariate state estimation model, such as in first data report format 800, and (ii) the limited multivariate state estimation model, such as in second data report format 850.

One example advantage of the first data report format 800 is that the details of the MSET (or MSET2) auditability algorithm are not revealed. One example advantage of the second data report format (850) is the reduced amount of data that must be provided in the report. Note that the amount or volume of compressed data 720 will generally dominate the size of the report in both the first data report format 800 and the second data report format 850, so in practice the two formats may not differ significantly in size.

Referring again to FIG. 3, in one embodiment, the system reverses the MSET computation to reconstitute the raw data as shown at process block 365. For example, a data report following one of the data report formats 800, 850 is created and may be used to reconstruct data for audit of the archived time series database 305. Note that the reports are stored, for example, alongside journal entries, to await evaluation in the context of an audit of archived time series database 305. In some embodiment, the reports may be stored for a significant period of time before being used to reconstitute raw data. In some embodiments, the audit of archived time series database 305 may not occur, and the data reports are never retrieved and used to reconstitute raw data at process block 365. Also, the report may be distributed to third parties for external audit of the third party's copy of the archived time series database.

—Data Reconstruction Using Example First Data Report Format—

Figure 9:
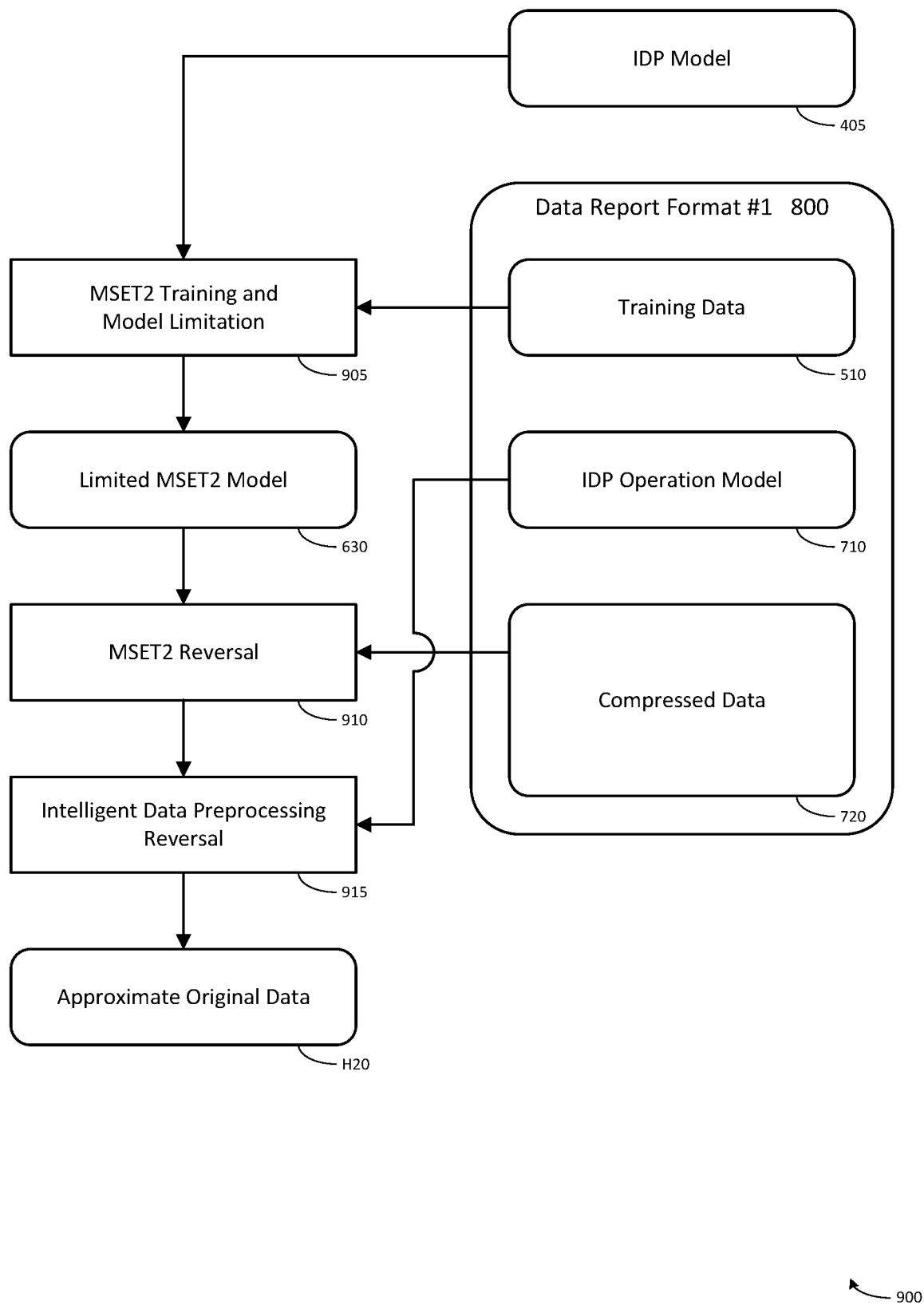
FIG. 9 illustrates a schematic of one embodiment of a data reconstruction process using a first data report format.

FIG. 9 illustrates a schematic of one embodiment of a data reconstruction process 900 using first data report format 800, the data reconstruction process 900 further being associated with ensuring that the results of machine learning models can be audited.

In one embodiment, in data reconstruction process 900, a limited MSET (or MSET2) model 630 is first trained using the IDP model 405 and training data 510 (for example as shown and described with reference to FIG. 5), and then limited (for example as shown and described with reference to FIG. 6), as shown at process block 905. The IDP model 405 is retrieved from storage and provided to the training and limitation process 905. The training data 510 is read from the data report 800. Creation of the limited MSET model 630 is needed due to the absence of the limited MSET model 630 from the first data report format 800.

In one embodiment, the system identifies a reverse state estimation computation that undoes the steps performed by the state estimation computation to form the state estimates from the original time series data values. For example, the MSET (or MSET2) algorithm is reversed and applied to the compressed data 720, as shown at process block 910. To reverse the MSET algorithm, the steps to form an MSET estimate performed by the trained model 630 are parsed to identify a sequence of discrete operations of the machine learning model, and the sequence of discrete operations is recorded. For each of the discrete operations in the sequence, the inverse operation which will undo the discrete operation is identified or determined, and recorded in a sequence of reverse operations. In one embodiment, the sequence of reverse operations should be in reverse order from the sequence of discrete operations. The inverse operations are therefore configured to be performed in a reverse order from the order that the discrete operations are performed in the machine learning model. For example, where a discrete operation is to be performed first in the sequence of discrete operations, the inverse operation corresponding to the the discrete operation is to be performed last in the sequence of reverse operations, the inverse operation of the second discrete operation is to be performed second to last in the sequence of reverse operations, and so forth, such that the inverse operations of the discrete operations are to be performed in the reverse order of the discrete operations. The system stores the sequence of reverse operations for subsequent processing.

In one embodiment, the system then generates a set of reverse state estimates for the original time series data from the set of state estimates. Each of the reverse state estimates is generated by performing the reverse state estimation for one of the set of state estimates, for example as indicated by the sequence of reverse operations. For example, the system performs the reverse of the MSET computations used to create the state estimates stored in the compressed data 720 on those state estimates. Reverse MSET estimates of the original time series data values at each observation are created from the state estimates of those values and the observed values of the other parameters stored in the compressed data 720. The sequence of reverse operations is executed for the estimated data values at each observation to create reverse MSET estimates for each of the estimated data values. In this way, the inverse operations are executed in the reverse order on the machine learning estimates to produce the reconstituted time series data.

In one embodiment, the intelligent data preprocessing 315 is also reversed and applied to the reverse MSET estimates, as shown at process block 915. In one embodiment, the IDP operation model 710 is read from the data report 800 and the original time series values retained in IDP operation model 710 are substituted for any corresponding values in the reverse MSET estimates, thereby reversing the intelligent data preprocessing 315 for the compressed data and forming reconstituted data, approximate original data 920. The reconstituted data 920 is stored for subsequent use in an audit process, including for example the verification process shown and described with reference to FIG. 3, blocks 310 and 370-380. Thus, the reconstituted time series data values for each of the state estimates is based on the reverse state estimates.

Note that the resulting reconstituted time series data approximates the original data in archived time series database 305, and may differ slightly from the original data. Nevertheless, the approximation may be used to verify that the archived time series database 305 is not tampered with or corrupted. Thus, the approximation can be used to verify that an archived time series database 305 that indicates compliance with regulations, or violation of regulations, truly indicates such compliance or violation.

—Data Reconstruction Using Example Second Data Report Format—

Figure 10:
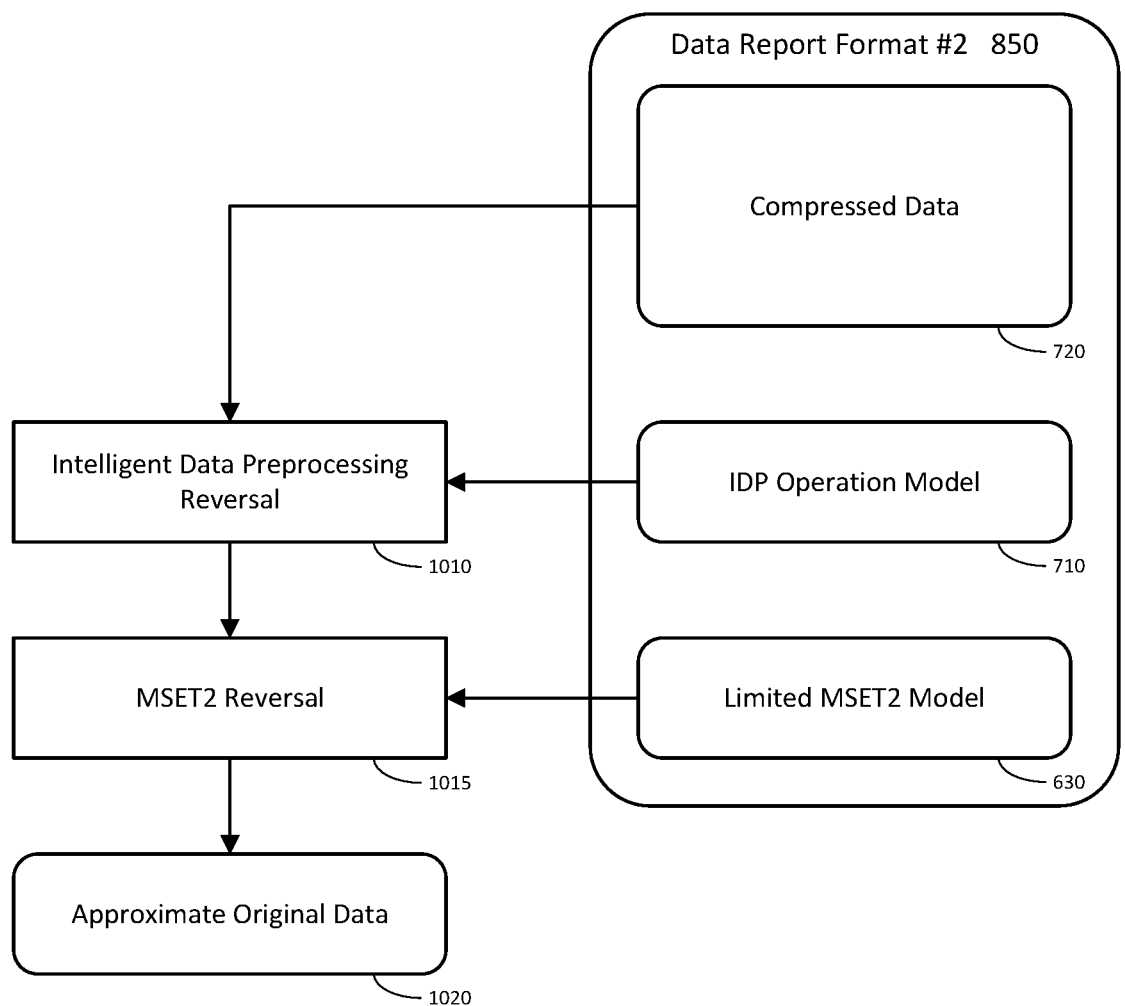
FIG. 10 illustrates a schematic of one embodiment of a data reconstruction process using a second data report format.

FIG. 10 illustrates a schematic of one embodiment of a data reconstruction process 1000 using second data report format 850, the data reconstruction process 1000 further being associated with ensuring that the results of machine learning models can be audited. The reconstruction process 1000 follows generally the same process steps as process 900, except that the limited MSET model 630 does not need to be first computed, because it is already stored in second data report format 850. Note that, in one embodiment, the order of performing intelligent data preprocessing 315 reversal 1010 and MSET reversal 1015 may be switched in process 1000 from the order of MSET reversal 910 preceding intelligent data preprocessing 315 reversal 915 in process 900.

In one embodiment, the intelligent data preprocessing 315 is first reversed and applied to the MSET estimates in the compressed data 720, as shown at process block 1010. In one embodiment, the IDP operation model 710 is read from the data report 800 and the original time series values retained in IDP operation model 710 are substituted for any corresponding values in MSET estimates in the compressed data, thereby reversing the intelligent data preprocessing 315 for the compressed data 720. Thus, the reconstituted time series data values for each of the state estimates is based on reverse state estimates such as those described with reference to process block 1015.

In one embodiment, the MSET (or MSET2) algorithm is reversed and applied to the compressed data 720, as shown at process block 1015, in a similar manner as that described with reference to process block 910 above. For example, the system performs the reverse of the MSET computations used to create the state estimates stored in the compressed data 720 on those state estimates. Reverse MSET estimates of the original time series data values at each observation are created from the state estimates of those values and the observed values of the other parameters stored in the compressed data 720. The reverse MSET estimates and replaced intelligent data preprocessing values from process block 1010 form reconstituted data, approximate original data 1020. The reconstituted data 1020 is stored for subsequent use in an audit process which may include, for example, the validation process shown and described with reference to FIG. 3, blocks 310 and 370-380. As in process 900 above, the resulting time series data approximates the original data in archived time series database 305, and may differ slightly from the original data, but may be used to verify that the archived time series database 305 is not tampered with or corrupted.

—Tampering Report—

If there has been no deliberate tampering (or accidental data corruption) in the "original" timeseries data (the comparison indicates a match in the statistics sense), the system certifies that the original data is intact, otherwise the original data is corrupted.

Referring again to FIG. 3, the system proceeds to perform an audit of the state (intact or corrupted/tampered with) of an original time series in the archived time series database 305. In one embodiment, in the context of this audit, the correctness of a reported time series is verified using the reconstituted data: the original data is compared with reconstituted (or reconstructed) data, for example reconstituted data 920 resulting from process 900 or reconstituted data 1020 resulting from process 1000. The two data streams, original time series and reconstituted time series, are compared pairwise, as shown at pairwise difference analyzer, process block 310. The pairwise difference analyzer 310 compares the original time series data values and the reconstituted time series data values for each observation of the two time series to see if the reconstituted value matches (or closely approximates within a threshold) the original value.

In one embodiment, the pairwise difference analyzer compares each the original time series data value and the reconstituted time series data value for each observation to determine if it varies by more than a preset threshold amount, for example, a percentage amount. In another embodiment, the pairwise difference analyzer compares each original time series data value and the reconstituted time series data value for each observation to determine if it triggers a fault detection using a trained fault detection model included in the trained, limited MSET2 model 630. The fault detection model may employ a sequential probability ratio test (SPRT) to analyze the residuals between the original time series data value and the reconstituted time series data value for each observation to determine whether or not the purported original time series data is anomalous. Thus, in one embodiment, the ML audit assurance system 140 compares values from the reconstituted time series data and original time series data pairwise using a SPRT test that detects tampering or corruption as an anomaly—an anomalous deviation between the reconstituted and original time series values.

The results of the pairwise comparison are evaluated at decision block 370. If the two data streams match (YES), then the verification is passed, and processing proceeds to process block 375. If the two data streams do not match (NO), then the verification fails, and processing proceeds to process block 380.

At process block 375, a 'passed' verification report indicating that the original time series data is intact is generated. In one embodiment, the passed verification report is a signal that when parsed, indicates that the original time series data is intact. In one embodiment, the passed verification report is a human readable document indicating that the original time series data is intact. In one embodiment, in response to the passed verification report, the system generates and either executes or transmits for execution an instruction to display an indication that the original time series data is intact on a graphical user interface (GUI). Thus, in one embodiment, the electronic verification report is displayed by a computer in the GUI to indicate that the audit is passed, and that no tampering or corruption is detected. The GUI may be associated with a utility entity or a regulatory entity. Processing in process 300 then ends.

At process block 380, a 'failed' verification report indicating that the original time series data is corrupted or tampered with is generated. In one embodiment, the failed verification report is a signal that when parsed, indicates that the original time series data is corrupted or tampered with. In one embodiment, the failed verification report is a human readable document indicating that the original time series data is corrupted or tampered with. In one embodiment, in response to the failed verification report, the system generates and either executes or transmits for execution an instruction to display an indication that the original time series data is corrupted or tampered with on a GUI. Thus, in one embodiment, the electronic verification report is displayed by a computer in the GUI to indicate that the audit is failed, and that tampering or corruption is detected or suspected. The GUI may be associated with a utility entity or a regulatory entity. Processing in process 300 then ends.

Thus, in response to the signal that the database under audit has not been modified, the system generates an electronic verification report message indicating that the database under verification is certified to be uncorrupted and not tampered with. In response to the signal that the database under audit has been modified, the system generates an electronic verification report message indicating that the database under audit is either corrupted or tampered with. The system may then transmit the generated electronic verification report to a computing device to cause the verification report message to be stored by the computing device or displayed by the computing device. In one embodiment, the computing device may be associated with a utility entity or a regulatory entity.

—Software Module Embodiments—

In general, software instructions are designed to be executed by a suitably programmed processor. These software instructions may include, for example, computer-executable code and source code that may be compiled into computer-executable code. These software instructions may also include instructions written in an interpreted programming language, such as a scripting language.

In a complex system, such instructions are typically arranged into program modules with each such module performing a specific task, process, function, or operation. The entire set of modules may be controlled or coordinated in their operation by an operating system (OS) or other form of organizational platform.

In one embodiment, one or more of the components, functions, methods, or processes described herein are configured as modules stored in a non-transitory computer readable medium. The modules are configured with stored software instructions that when executed by at least a processor accessing memory or storage cause the computing device to perform the corresponding function(s) as described herein.

—Cloud System, Multi-Tenant, and Enterprise Embodiments—

In one embodiment, the present system is a computing/data processing system including an application or collection of distributed applications for enterprise organizations. The applications and computing system may be configured to operate with or be implemented as a cloud-based networking system, a software as a service (SaaS) architecture, or other type of networked computing solution. In one embodiment the present system is a centralized server-side application that provides at least the functions disclosed herein and that is accessed by many users via computing devices/terminals communicating with the computing system (functioning as the server) over a computer network.

—Computing Device Embodiment—

Figure 11:
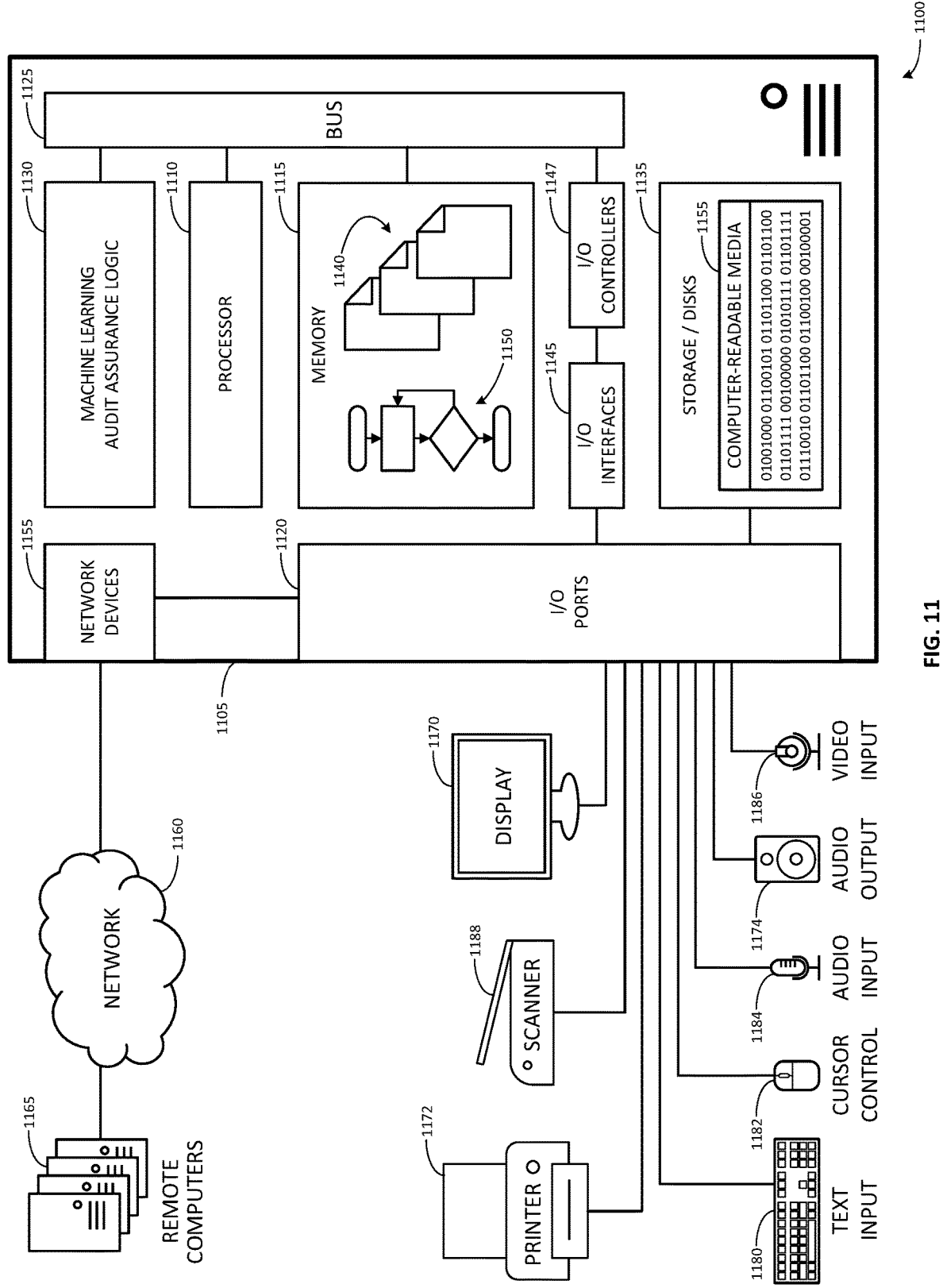
FIG. 11 illustrates an example computing device that is configured and/or programmed with one or more of the example systems and methods described herein, and/or equivalents.

FIG. 11 illustrates an example computing device 1100 that is configured and/or programmed with one or more of the example systems and methods described herein, and/or equivalents. The example computing device may be a computer 1105 that includes a processor 1110, a memory 1115, and input/output ports 1120 operably connected by a bus 1125. In one example, the computer 1105 may include machine learning audit assurance logic 1130 configured to facilitate ensuring that the results of machine learning models can be audited, similar to logic and systems shown in FIGS. 1 through 10. In different examples, the logic 1130 may be implemented in hardware, a non-transitory computer-readable medium with stored instructions, firmware, and/or combinations thereof. While the logic 1130 is illustrated as a hardware component attached to the bus 1125, it is to be appreciated that in other embodiments, the logic 1130 could be implemented in the processor 1110, stored in memory 1115, or stored in disk 1135. In one embodiment, logic 1130 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to ensure that the results of machine learning models can be audited. The means may also be implemented as stored computer executable instructions that are presented to computer 1105 as data 1140 that are temporarily stored in memory 1115 and then executed by processor 1110.

Logic 1130 may also provide means (e.g., hardware, non-transitory computer-readable medium that stores executable instructions, firmware) for ensuring that the results of machine learning models can be audited.

Generally describing an example configuration of the computer 1105, the processor 1110 may be a variety of various processors including dual microprocessor and other multi-processor architectures. A memory 1115 may include volatile memory and/or non-volatile memory. Non-volatile memory may include, for example, ROM, PROM, and so on. Volatile memory may include, for example, RAM, SRAM, DRAM, and so on.

A storage disk 1135 may be operably connected to the computer 1100 via, for example, an input/output (I/O) interface (for example, card, device) 1145 and an input/output port 1120. The disk 1135 may be, for example, a magnetic disk drive, a solid-state disk drive, a floppy disk drive, a tape drive, a Zip drive, a flash memory card, a memory stick, and so on. Furthermore, the disk 1135 may be a CD-ROM drive, a CD-R drive, a CD-RW drive, a DVD ROM, and so on. The memory 1115 can store a process 1150 and/or a data 1140, for example. The disk 1135 and/or the memory 1115 can store an operating system that controls and allocates resources of the computer 1105.

The computer 1105 may interact with input/output (I/O) devices via the I/O interfaces 1145 and the input/output ports 1120. Input/output devices may be, for example, a keyboard 1180, a microphone 1184, a pointing and selection device 1182, cameras 1186, video cards, displays 1170, scanners 1188, printers 1172, speakers 1174, the disk 1135, the network devices 1155, and so on. The input/output ports 1120 may include, for example, serial ports, parallel ports, and USB ports.

The computer 1105 can operate in a network environment and thus may be connected to the network devices 1155 via the I/O interfaces 1145, and/or the I/O ports 1120. Through the network devices 1155, the computer 1105 may interact with a network 1160. Through the network 1160, the computer 1105 may be logically connected to remote computers 1165. Networks with which the computer 1105 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
XML: extensible markup language.
WAN: wide area network.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. One or more non-transitory computer-readable media storing computer-executable instructions that, when executed by at least a processor of a computer, cause the computer to:
   access original time series data and machine learning estimates of the original time series data;
   generate reconstituted time series data from the machine learning estimates by reversing operations of a machine learning model trained for generating the machine learning estimates from the original time series data;
   detect tampering in the original time series data based on a difference between the original time series data and reconstituted time series data; and
   generate an electronic verification report that indicates whether the tampering is detected in the original time series data.

2. The non-transitory computer-readable media of claim 1, wherein the instructions for reversing operations of the machine learning model further cause the computer to:
   identify the operations of the machine learning model;
   determine an inverse operation for each of the operations that undoes the operation;
   configure the inverse operations to be performed in a reverse order from that of the machine learning model; and
   execute the inverse operations in the reverse order on the machine learning estimates to produce the reconstituted time series data.

3. The non-transitory computer-readable media of claim 1, wherein the instructions for detecting tampering in the original time series data further cause the computer to compare values from the reconstituted time series data and original time series data pairwise using a sequential probability ratio test that detects the tampering as an anomaly.

4. The non-transitory computer-readable media of claim 1, wherein the instructions further cause the computer to, prior to generating reconstituted time series data:
   select a training data set from the original time series data that was captured prior to an update to the original time series data; and
   train the machine learning model to generate estimates consistent with correlation patterns learned between time series signals of the training data set.

5. The non-transitory computer-readable media of claim 1, wherein the instructions further cause the computer to, prior to generating reconstituted time series data, reduce complexity of the trained machine learning model by limiting the trained machine learning model to major components of a matrix that represents the trained machine learning model.

6. The non-transitory computer-readable media of claim 1, wherein the machine learning estimates are multivariate state estimates, and the machine learning model is a multivariate state estimation model.

7. The non-transitory computer-readable media of claim 1, wherein the instructions further cause the computer to display the electronic verification report on a graphical user interface.

8. A computing system, comprising:
   a processor;
   a memory operably connected to the processor;
   one or more non-transitory computer-readable media operably connected to the processor and memory and storing computer-executable instructions that when executed by at least the processor of the computing system cause the computing system to:
      access original time series data and machine learning estimates of the original time series data;
      generate reconstituted time series data from the machine learning estimates by reversing operations of a machine learning model trained for generating the machine learning estimates from the original time series data;
      detect corruption in the original time series data based on a difference between the original time series data and reconstituted time series data; and
      generate an electronic verification report that indicates whether the corruption is detected in the original time series data.

9. The computing system of claim 8, wherein the instructions for reversing operations of the machine learning model further cause the computing system to:
   identify the operations of the machine learning model;
   determine an inverse operation for each of the operations that undoes the operation;
   configure the inverse operations to be performed in a reverse order from that of the machine learning model; and
   execute the inverse operations in the reverse order on the machine learning estimates to produce the reconstituted time series data.

10. The computing system of claim 8, wherein the instructions for detecting corruption in the original time series data further cause the computing system to compare values from the reconstituted time series data and original time series data pairwise using a sequential probability ratio test that detects the corruption as an anomaly.

11. The computing system of claim 8, wherein the instructions further cause the computing system to, prior to generating reconstituted time series data:
   select a training data set from the original time series data that was captured prior to an update to the original time series data; and
   train the machine learning model to generate estimates consistent with correlation patterns learned between time series signals of the training data set.

12. The computing system of claim 8, wherein the instructions further cause the computing system to, prior to generating reconstituted time series data, reduce complexity of the trained machine learning model by limiting the trained machine learning model to major components of a matrix that represents the trained machine learning model.

13. The computing system of claim 8, wherein the machine learning estimates are multivariate state estimates, and the machine learning model is a multivariate state estimation model.

14. The computing system of claim 8, wherein the instructions further cause the computing system to display the electronic verification report on a graphical user interface.

15. A computer-implemented method, comprising:
   accessing original time series data and machine learning estimates of the original time series data;
   generating reconstituted time series data from the machine learning estimates by reversing operations of a machine learning model trained for generating the machine learning estimates from the original time series data;
   detecting tampering in the original time series data based on a difference between the original time series data and reconstituted time series data; and
   generating an electronic verification report that indicates whether the tampering is detected in the original time series data.

16. The computer-implemented method of claim 15, wherein reversing operations of the machine learning model further comprises:
   identifying the operations of the machine learning model;
   determining an inverse operation for each of the operations that undoes the operation;
   configuring the inverse operations to be performed in a reverse order from that of the machine learning model; and
   executing the inverse operations in the reverse order on the machine learning estimates to produce the reconstituted time series data.

17. The computer-implemented method of claim 15, wherein detecting tampering in the original time series data further comprises comparing values from the reconstituted time series data and original time series data pairwise using a sequential probability ratio test that detects the tampering as an anomaly.

18. The computer-implemented method of claim 15, further comprising, prior to generating reconstituted time series data:
   select a training data set from the original time series data that was captured prior to an update to the original time series data; and
   training the machine learning model to generate estimates consistent with correlation patterns learned between time series signals of the training data set.

19. The computer-implemented method of claim 15, further comprising, prior to generating reconstituted time series data, reducing complexity of the trained machine learning model by limiting the trained machine learning model to major components of a matrix that represents the trained machine learning model.

20. The computer-implemented method of claim 15, wherein the machine learning estimates are multivariate state estimates, and the machine learning model is a multivariate state estimation model.

* * * * *